(12) United States Patent
Matsumoto

(10) Patent No.: US 7,574,027 B2
(45) Date of Patent: Aug. 11, 2009

(54) BACK PROJECTION METHOD IN IMAGE RECONSTRUCTION

(75) Inventor: Kazuhiko Matsumoto, Minato-ku (JP)

(73) Assignee: Ziosoft, Inc., Tokyo (JP)

( * ) Notice: Subject to any disclaimer, the term of this patent is extended or adjusted under 35 U.S.C. 154(b) by 707 days.

(21) Appl. No.: 11/111,311

(22) Filed: Apr. 21, 2005

(65) Prior Publication Data

US 2006/0039592 A1    Feb. 23, 2006

(30) Foreign Application Priority Data

Aug. 18, 2004  (JP) ............... 2004-238043

(51) Int. Cl.
*G06K 9/00* (2006.01)
(52) U.S. Cl. .................................... 382/128
(58) Field of Classification Search ............. 382/128, 382/131
See application file for complete search history.

(56) References Cited

U.S. PATENT DOCUMENTS 5,779,641 A * 7/1998 Hatfield et al. ............. 600/443

FOREIGN PATENT DOCUMENTS

JP    2003-038480    2/2003

OTHER PUBLICATIONS

Johann Radon, "Über die Bestimmung von Funktionen durch ihre Integratwerte längs gewisser Mannigfaltigkeiten", Apr. 1917, pp. 71-86.
Kak et al., "Principles of Computerized Tomographic Imaging", 1987, pp. 60-75.
Xu et al., "Towards a Unified Framework for Rapid 3D Computed Tomography on Commoidy GPUs", Oct. 2003.
Hadwiger et al., "Hardware-Accelerated High-Quality Reconstruction of Volumetric Data on PC Graphics Hardware", 2001.

* cited by examiner

*Primary Examiner*—Tom Y Lu
(74) *Attorney, Agent, or Firm*—Pearne & Gordon LLP

(57) ABSTRACT

A back projection method in CT image reconstruction method in which projection data obtained by irradiating a subject with electromagnetic wave and detecting the electromagnetic wave transmitted through the subject are back-projected onto a CT image reconstruction region virtually set on a region of interest of the subject, said back projection method comprising: generating a projected image redundant arrangement form in which the projection data are arranged so as to be redundant and gathered to access units; and performing a vector operation for the projection data arranged in the projected image redundant arrangement form. According to the back projection method of the invention, the vector operation can be performed efficiently while real-number arithmetic operation which is necessary for addressing can be omitted. Accordingly, back projection calculation can be performed speedily.

17 Claims, 37 Drawing Sheets

STRETCH EXTRACTED ROW BY INTERPOLATION (2)

EXAMPLE: STRETCHED BY MAGNIFYING POWER OF 3

EXAMPLE OF PROJECTED IMAGE REDUNDANT ARRANGEMENT FORM

WHEN SIMULTANEOUS CALCULATION NUMBER m = 4
AND ACCESS INTERVAL i = 3

EXAMPLE OF PROJECTED IMAGE REDUNDANT ARRANGEMENT FORM

VECTOR ARITHMETIC OPERATION ACCORDING TO THE FIRST EMBODIMENT

SIMULTANEOUS CALCULATION ON CONTINUOUS PIXELS

SECOND EMBODIMENT

SIMULTANEOUS CALCULATION ON DISTRIBUTED PIXELS

FIG. 21A  DATA ARRANGEMENT OF THE FIRST EMBODIMENT

| 0 | 1 | 2 | 3 | 4 | 5 | 6 | 7 | 8 | 9 | 10 | 11 |
|---|---|---|---|---|---|---|---|---|---|----|----|
| 3 | 4 | 5 | 6 | 7 | 8 | 9 | (10) | 11 | 12 | 13 | 14 |
| 6 | 7 | 8 | 9 | (10) | 11 | 12 | 13 | 14 | 15 | 16 | 17 |
| 9 | (10) | 11 | 12 | 13 | 14 | 15 | 16 | 17 | 18 | 19 | 20 |

FIG. 21B  DATA ARRANGEMENT OF THE SECOND EMBODIMENT

| 0 | 1 | 2 | 3 | 4 | 5 | 6 | 7 | (8) | 9 | 10 | 11 |
|---|---|---|---|---|---|---|---|---|---|----|----|
| (8) | 9 | 10 | 11 | 12 | 13 | 14 | 15 | 16 | 17 | 18 | 19 |
| 16 | 17 | 18 | 19 | 20 | 21 | 22 | 23 | 24 | 25 | 26 | 27 |
| 24 | 25 | 26 | 27 | 28 | 29 | 30 | 31 | 32 | 33 | 34 | 35 |

WAY OF REARRANGEMENT IN SECOND EMBODIMENT AND PROJECTION METHOD CONSIDERING THE WAY OF REARRANGEMENT

PROJECTION OF DATA FOR ONE ROW IN PROJECTED IMAGE

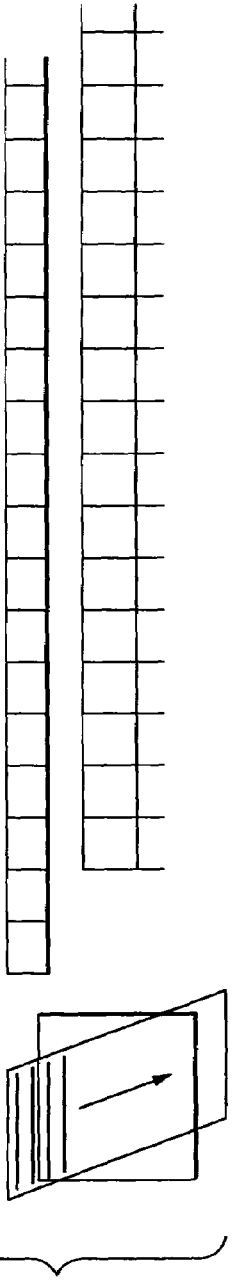
FIG. 23A
FIG. 23B

FIG. 25

INTERPOLATION CALCULATION

| -2 | -1 | f0 → 0 | f1 → 1 | 2 | 3 | 4 | 5 | 6 | 7 | 8 | 9 | 10 | 11 |
|---|---|---|---|---|---|---|---|---|---|---|---|---|---|
| 6 | 7 | 8 | 9 | 10 | 11 | 12 | 13 | 14 | 15 | 16 | 17 | 18 | 19 |
| 14 | 15 | 16 | 17 | 18 | 19 | 20 | 21 | 22 | 23 | 24 | 25 | 26 | 27 |
| 22 | 23 | 24 | 25 | 26 | 27 | 28 | 29 | 30 | 31 | 32 | 33 | 34 | 35 |

2 DATA ARE NECESSARY FOR LINEAR INTERPOLATION IN INTERPOLATION CALCULATION

INTERPOLATION VALUE = f0*α + f1*(1 - α)

... α IS INTERPOLATION COEFFICIENT

FIG. 26A

| -2 | -1 | 0 | 1 | 2 | 3 | 4 | 5 | 6 | 7 | 8 | 9 | 10 | 11 |
| --- | --- | --- | --- | --- | --- | --- | --- | --- | --- | --- | --- | --- | --- |
| 6 | 7 | 8 | 9 | 10 | 11 | 12 | 13 | 14 | 15 | 16 | 17 | 18 | 19 |
| 14 | 15 | 16 | 17 | 18 | 19 | 20 | 21 | 22 | 23 | 24 | 25 | 26 | 27 |
| 22 | 23 | 24 | 25 | 26 | 27 | 28 | 29 | 30 | 31 | 32 | 33 | 34 | 35 |

FIG. 26B

| -1.9 | -0.9 | 0.1 | 1.1 | 2.1 | 3.1 | 4.1 | 5.1 | 6.1 | 7.1 | 8.1 | 9.1 | 10.1 | 11.1 |
| --- | --- | --- | --- | --- | --- | --- | --- | --- | --- | --- | --- | --- | --- |
| 6.1 | 7.1 | 8.1 | 9.1 | 10.1 | 11.1 | 12.1 | 13.1 | 14.1 | 15.1 | 16.1 | 17.1 | 18.1 | 19.1 |
| 14.1 | 15.1 | 16.1 | 17.1 | 18.1 | 19.1 | 20.1 | 21.1 | 22.1 | 23.1 | 24.1 | 25.1 | 26.1 | 27.1 |
| 22.1 | 23.1 | 24.1 | 25.1 | 26.1 | 27.1 | 28.1 | 29.1 | 30.1 | 31.1 | 32.1 | 33.1 | 34.1 | 35.1 |

(CONT.)

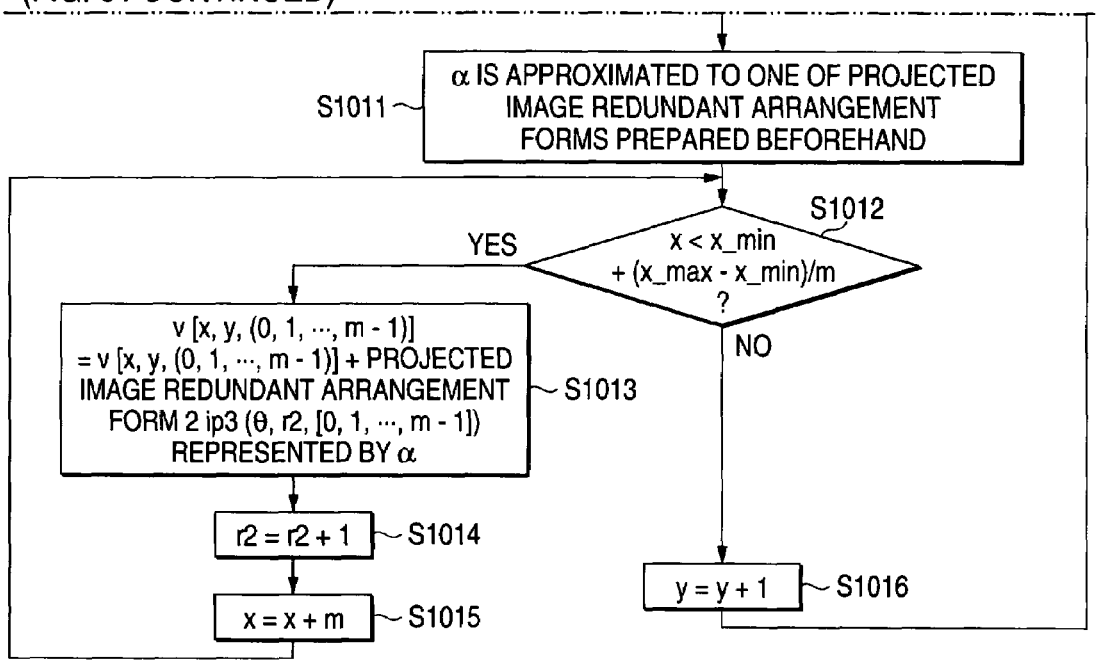

BACK PROJECTION (INVERSE RADON TRANSFORMATION)
$$f(x,y) = \frac{1}{2\pi} \int_0^\pi q(x\cos\theta + y\sin\theta, \theta) d\theta$$

CONVOLUTION CALCULATION FORMULA
$$\begin{cases} q(r',\theta) = \int h(r'-r) p(r,\theta) dr \\ h(r) = \frac{1}{2\pi} \int |\omega| \exp(j\omega r) d\theta \end{cases} \quad \cdots \text{ONE EXAMPLE}$$

BACK PROJECTION METHOD IN IMAGE RECONSTRUCTION

This application claims foreign priority based on Japanese Patent application No. 2004-238043, filed Aug. 18, 2004, the contents of which is incorporated herein by reference in its entirety.

BACKGROUND OF THE INVENTION

1. Field of the Invention

The present invention relates to a back projection method in image reconstruction, and particularly to a method for arranging data allocation and computation sequence to perform calculation of back projection in image reconstruction fast.

2. Description of the Related Art

An internal structure of a human body can be obtained noninvasively in the form of tomogram by CT (Computed Tomography) apparatus. Recently, the internal structure can be obtained as a three-dimensional structure by using a plurality of tomograms with the progress in the apparatus.

X-ray image is a projected image, and CT image can be reconstructed from sectional images by back projecting the X-ray projection data photographed from a plurality of angles. This basic principle is described mathematically in "Uber die bestimmung von funktionen durch ihre intergralwerte langsgewisser mannigfaltigkeiten (on the determination of functions from their integrals along certain manifolds)", J. Radon, Berichte Saechsische Akademie der Wissenschaften, vol. 29, pp. 262-277, 1917, and various calculation methods have been invented since then.

Currently, the main reconstruction method is back projection (hereinafter referred to as BP method) which is one of the methods of performing a back projection process for each two-dimensional section. The BP method is described in detail, for example, in "Principles of Computerized Tomographic Imaging (Classics in Applied Mathematics, 33)" by Avinash C. Kak, Malcolm Slaney: ISBN: 089871494X, pp. 60-75. There are developed BP methods such as filtered back projection (hereinafter referred to as FBP method) and convolution back projection-(hereinafter referred to as CBP method).

As an enormous amount of time is needed in the calculation of CT reconstruction, exclusive hardware is constructed and image processing hardware is used in the related art, in order to speed up the calculation. For example, such a technique is described in "OS Towards a Unified Framework for Rapid 3D Computed Tomography on Commodity GPUs", Fang Xu and Klaus Mueller, Stony Brook University, Oct. 29, 2003, and "Hardware-Accelerated High-Quality Reconstruction of Volumetric Data on PC Graphics Hardware", Markus Hadwiger, 2001.

A method for generating a CT image according to the related art is described below in brief. FIG. 32 is a flowchart showing the outline of a calculation procedure in the CT image generating method according to the related art. FIG. 33 is a schematic view for explaining a standard CT image generating method of a CT apparatus in the related art. FIG. 34 is an explanatory view showing a process for generating a projected image from an original X-ray image with the CT apparatus in the related art. FIG. 35 is an explanatory view showing a process of reconstructing the original image from the projected image.

X-ray image is an image projected from a single angle, and is a one-dimensional image. Accordingly, as shown in FIG. 33, two-dimensional image is synthesized by obtaining one-dimensional images from a plurality of angles ranging from 0° to 180°, while an X-ray generator is rotated around a subject.

As shown in FIG. 34, original image taken by X-ray photography is projected (mapped) from orthogonal coordinates (x,y) to rotating coordinates (r,θ), thereby generating a projected image (Sinogram). The projection is performed by Radon transformation represented by the expression 1, so that transformed projected image data is input to a computer (step S51 in FIG. 32).

$$p(r,\theta)=\int f(x, y)ds \qquad \text{[Expression 1]}$$

Then, before performing the back projection, a filtering process is performed in order to prevent the image from being blurred by numerical error (step S52). This process will be referred to as a filtering portion or a convolution portion. Then, back projection is performed to the filtering-processed projected image (step S53).

As shown in FIG. 35, in the back projection, each projected image is additively projected onto a reconstructed image line-by-line in accordance with the angle from which the projected image is obtained. This process is referred to as a back projection portion. The back projection (inverse Radon transformation) is performed by the expression 2, and the convolution calculation is performed by the expression 3.

$$f(x, y) = \frac{1}{2\pi} \int_0^\pi q(x\cos\theta + y\sin\theta, \theta)d\theta \qquad \text{[Expression 2]}$$

$$\begin{cases} q(r', \theta) = \int h(r' - r) p(r, \theta) dr \\ h(r) = \frac{1}{2\pi} \int |\omega| \exp(j\omega r) d\theta \end{cases} \qquad \text{[Expression 3]}$$

On the other hand, in the CT image generating method, real number calculation is frequently performed, and a large amount of time is required in the calculation for reconstructing a tomogram after taking CT sinogram images. Particularly, a large amount of time is required for real number interpolation calculation in back projection calculation. Therefore, some methods are proposed for increasing the speed of back projection in the reconstruction of a tomogram.

FIG. 36 is a flow chart for explaining an acceleration algorithm for back projection calculation disclosed in JP-A-2003-38480. In this calculation method, interpolated stretched data to which the back projection data is stretched for m times is calculated by interpolation before back projection. Then back projection is performed onto a tomogram reconstruction region. At the time of back projection, interpolated stretched data is back projected, being specified by multiplying the projected coordinates of each point which is to be reconstructed for m times.

In the back projection calculation, interpolated stretched data to which the back projection data is stretched for m times is calculated by interpolation before back projection. Then the process time for calculation of angle θ is shortened, which is in the innermost loop among a triple loop calculation concerning coordinate x, coordinate y and angle θ. That is, to obtain a projected value p for an angle θ, interpolation is not performed on the spot. An approximate value which is obtained beforehand by the interpolated stretched data is used so that the processing time for calculation (step S611) can be shortened (e.g. see JP-A-2003-38480).

In the back projection calculation in the CT image generating method according to the related art, calculation time is shortened by skipping the interpolation calculation of step S611 in FIG. 36. However, it is not sufficient for speeding up the calculation time, because real-number calculation for coordinate calculation in step S609 in FIG. 36 is performed in the innermost loop of the triple loop.

SUMMARY OF THE INVENTION

An object of the present invention is to provide a back projection method which can increase the speed of image reconstruction.

In the present invention, in the inner loop calculation of a numerical process, data arrangement is devised so that the processing performance of a computer during the inner loop calculation is improved and the processing speed is increased. In addition, the processing speed is further improved by a vector operation.

One aspect of the invention is a back projection method in an image reconstruction method in which a projection data of a subject is back-projected onto an image reconstruction region virtually set on a region of interest of the subject, the back projection method comprises generating a projected image redundant arrangement form in which the projection data is rearranged so that the projection data has a redundant arrangement, where the projection data is arranged on continuous memory addresses by a predetermined access interval to extent of an access unit or a multiple number for redundancy (which is same as a simultaneous calculation number), which represents times of calculating the projection data simultaneously by a single access to a memory storing each of the projection data, and performing a back projection calculation using the projected image redundant arrangement form.

According to this configuration, because the projected image redundant arrangement form is generated so that the projection data is arranged so as to be redundant and collected to access units, efficiency in use of a computer can be improved. Accordingly, the image reconstruction process can be performed speedily.

In the back projection method according to the invention, the projection data is obtained by irradiating a subject with an electromagnetic wave which is radiolucent, and detecting the electromagnetic wave transmitted through the subject.

The back projection method according to the invention further comprising performing a vector operation for the projection data arranged in the projected image redundant arrangement form.

According to this configuration, because a vector operation is performed for the projection data arranged in the projected image redundant arrangement form, a plurality of calculations can be performed simultaneously by one instruction. Accordingly, the image reconstruction can be performed more speedily.

In the back projection method according to the invention, the multiple number for redundancy in the projected image redundant arrangement form is not smaller than a simultaneous calculation number of the vector operation which is a number of the projection data which can be calculated simultaneously by the vector operation.

In the back projection method according to the invention, the multiple number for redundancy in the projected image redundant arrangement form is equal to a simultaneous calculation number of the vector operation which is a number of the projection data which can be calculated simultaneously by the vector operation.

In the back projection method according to the invention, the projected image redundant arrangement form is a form in which the projection data that is necessary for the vector operation is sequentially arranged being adjacent to one another.

The back projection method according to the invention further comprises generating a projected image projection form in which a beam angle of the projection data is used for performing a projection.

In the back projection method according to the invention, the back projection is performed by using a graphic processing unit.

In the back projection method according to the invention, the back projection is performed by network distributed processing.

The back projection method according to the invention further comprises stretching the projection data by interpolation to thereby generate the projected image projection form.

The back projection method according to the invention further comprises stretching the projection data by interpolation to thereby generate the projected image projection form in which a pixel pitch of a back-projected image is aligned with a pixel pitch of the projected image projection form.

In back projection method according to the invention, a magnifying power of the projected image projection form depends on the beam angle.

Another aspect of the invention is a computer-readable medium including a processor connected to at least one of an operating portion, a control portion, an image collecting portion, an image processing portion and an image display portion, the processor contains a set of instructions for back projection in image reconstruction in which a projection data of a subject is back-projected onto an image reconstruction region virtually set on a region of interest of the subject, the set of instructions comprises generating a projected image redundant arrangement form in which the projection data is rearranged so that each of the projection data has a redundant arrangement, where the projection data is arranged on continuous memory addresses by a predetermined access interval to extent of an access unit or a multiple number for redundancy, which represents times of calculating the projection data simultaneously by a single access to a memory storing each of the projection data, and performing a back projection calculation using the projected image redundant arrangement form.

BRIEF DESCRIPTION OF THE DRAWINGS

FIGS. 21A and 21B are views for explaining data arrangement in the second embodiment of the invention.

FIGS. 23A and 23B are views for explaining data arrangement in the second embodiment of the invention.

FIG. 25 is a view for explaining interpolation calculation in the second embodiment of the invention.

FIGS. 26A and 26B are views for explaining improvement in increasing speed while the image quality is maintained high by performing interpolation calculation in the second embodiment of the invention.

DESCRIPTION OF THE PREFERRED EMBODIMENTS

First Embodiment

Figure 1:
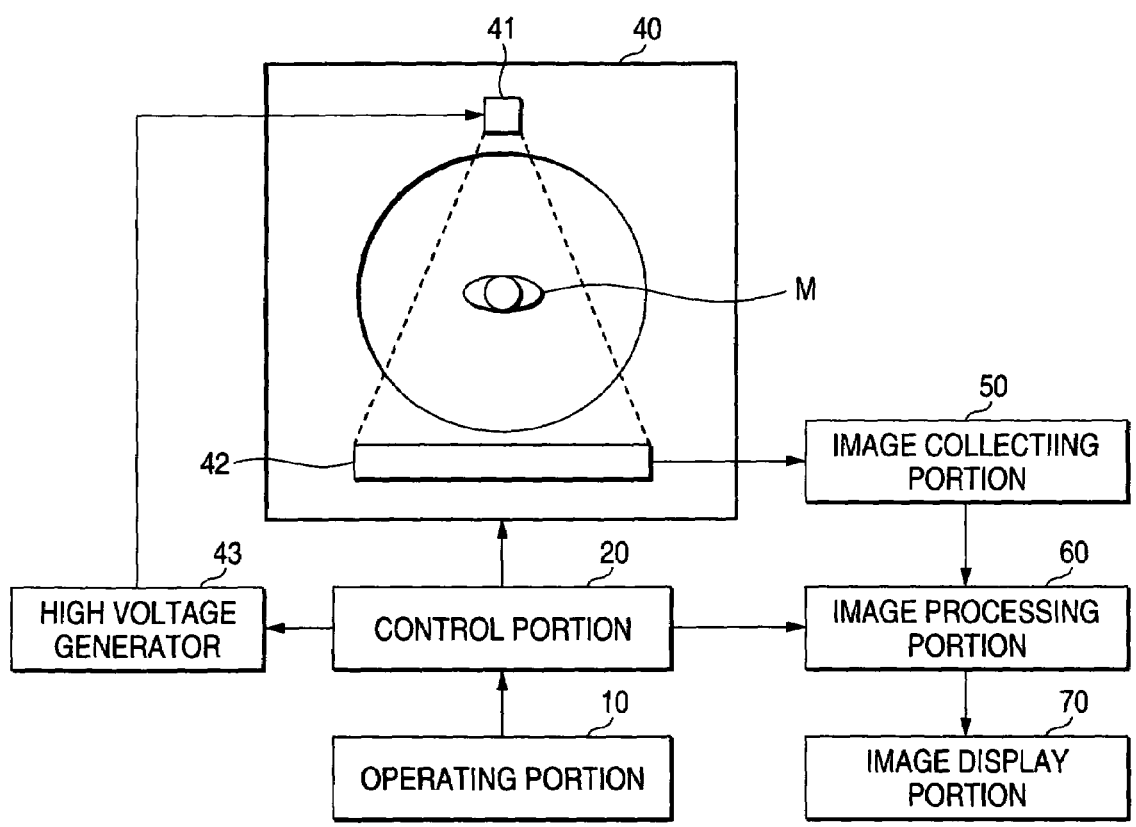
FIG. 1 is a schematic block diagram of a CT apparatus which can perform X-ray tomography scan by back projection method according to a first embodiment of the invention.

FIG. 1 is a schematic block diagram of a CT apparatus which can perform X-ray tomography scan by back projection method according to a first embodiment of the invention. The CT apparatus includes an operating portion 10 where setting data and command are input, a control portion 20 which controls the CT apparatus as a whole based on the setting data and command, a photographing portion 40 which photographs a region of interest of subject M, an image collecting portion 50 which collects image data detected from the photographing portion 40, an image processing portion 60 which generates a tomogram image of the region of interest of subject M on the basis of the image data from the image collecting portion 50, and an image display portion 70 which displays the tomogram image generated by the image processing portion 60.

A processor is connected to at least one of the operating portion 10, control portion 20, the image collecting portion 50, the image processing portion 60 and the image display portion 70. A processor may be included in the control portion 10.

The photographing portion 40 includes an X-ray tube 41 which cast the subject M with X-rays, and an X-ray detector 42 which detects the X-rays transmitted through the subject M. A high voltage generator 43 supplies necessary power such as tube current or tube voltage to the X-ray tube 41. A collimator and a slit may be attached to the X-ray tube 41 so that the subject M can be irradiated with a fan-beam-like or conical-beam-like X-rays.

The control portion 20 controls the CT apparatus entirely. For example, the control portion 20 is constituted with an exclusive hardware or by providing an apparatus control calculation method in a computer. When a user operates the operating portion 10 connected to the control portion 20, various X-ray data can be collected and displayed. For example, when the X-ray tube 41 and the high voltage generator 43 are controlled to generate X-rays, an electric signal into which the X-rays transmitted through the subject M are converted by the X-ray detector 42 is AD-converted by the image collecting portion 50 at the same time. In this manner, X-ray transmission data are obtained. Image processing such as sensitivity correction or distortion correction is performed on the X-ray transmission data by the image processing portion 60, and thus obtained photograph data can be displayed by the image display portion 70 accordingly.

Figure 2:
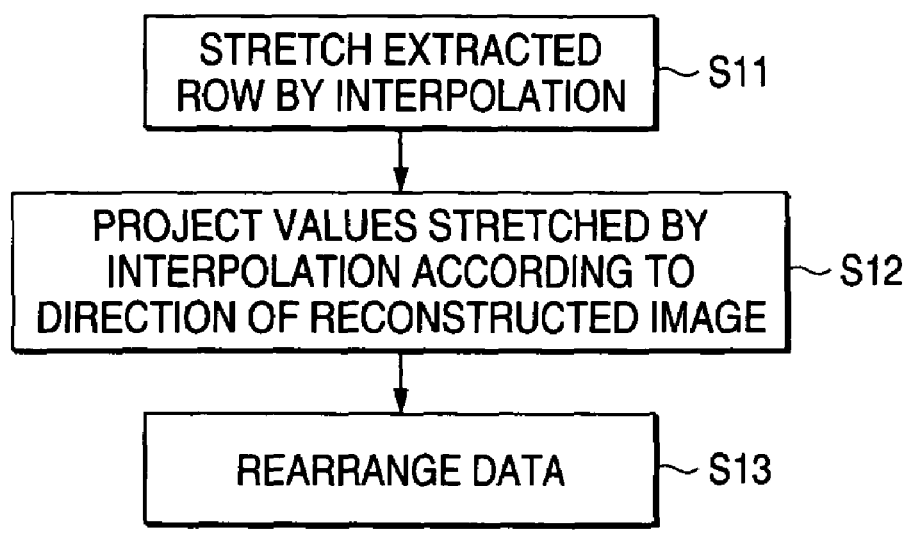
FIG. 2 is a schematic flow chart for explaining the back projection calculation method according to the first embodiment.

FIG. 2 is a schematic flow chart for explaining the back projection calculation method according to the first embodiment. In the back projection calculation method according to this embodiment, existing method is used as a basic formula of back projection. Accordingly, part of the back projection that is unique to the present invention is described mainly.

Figure 3:
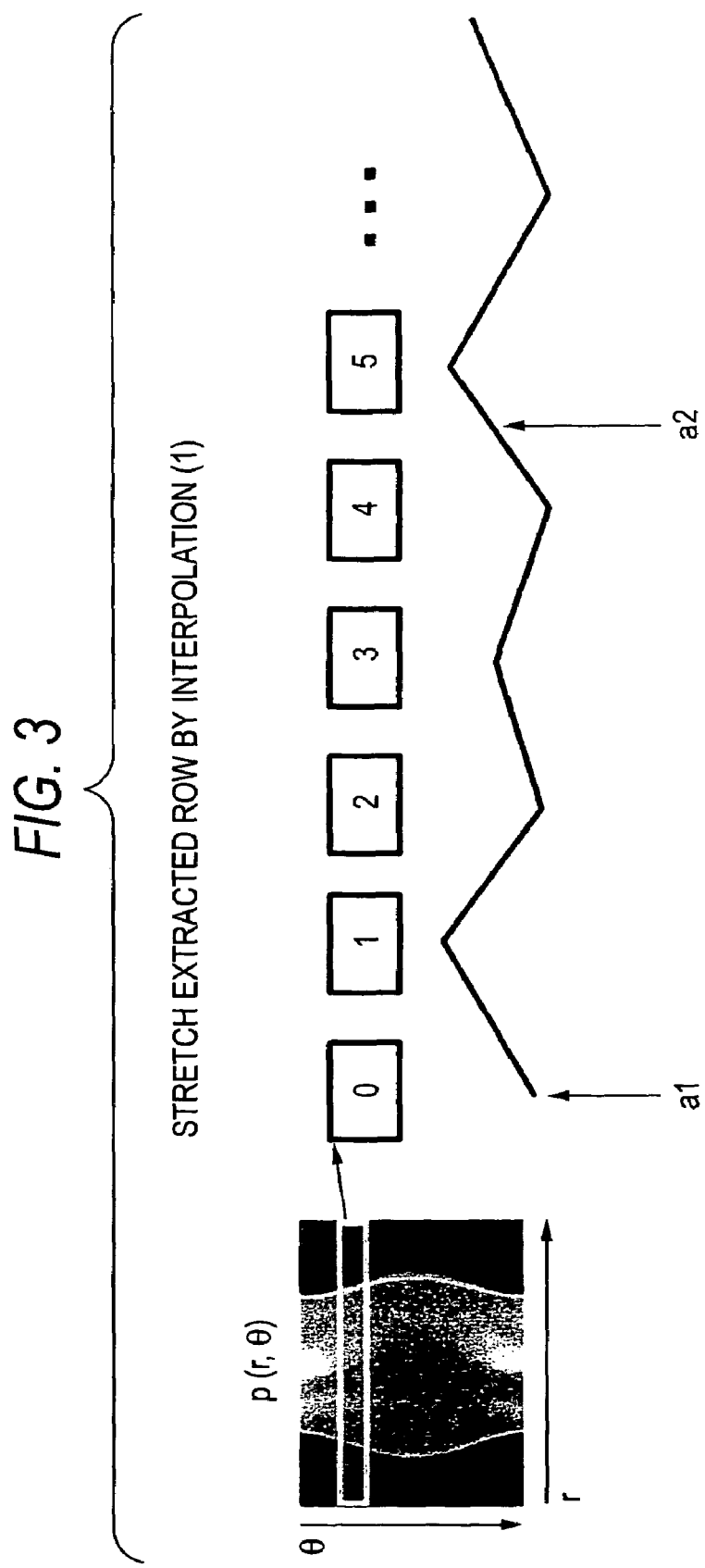
FIG. 3 is an explanatory view (1) showing a process for stretching an extracted row by interpolation.

In the back projection calculation method according to this embodiment, at first, an extracted row is stretched by interpolation (step S1). For example, the value at a point a1 in FIG. 3 can be obtained directly from the projected image, but the value at a point a2 in FIG. 3 needs to be calculated by interpolation because the value at the point a2 is the intermediate value between values of the projected image. Interpolation calculation for such intermediate values is performed in advance because calculation efficiency is decreased if the interpolation calculation is performed inside of the following loop calculation.

That is, each line on the projected image is projected so as to be parallel to a horizontal or vertical line on a reconstructed image while the line on the projected image is stretched in the horizontal direction. As a result, the calculation amount can be reduced because it is unnecessary to perform interpolation processes successively.

Figure 4:
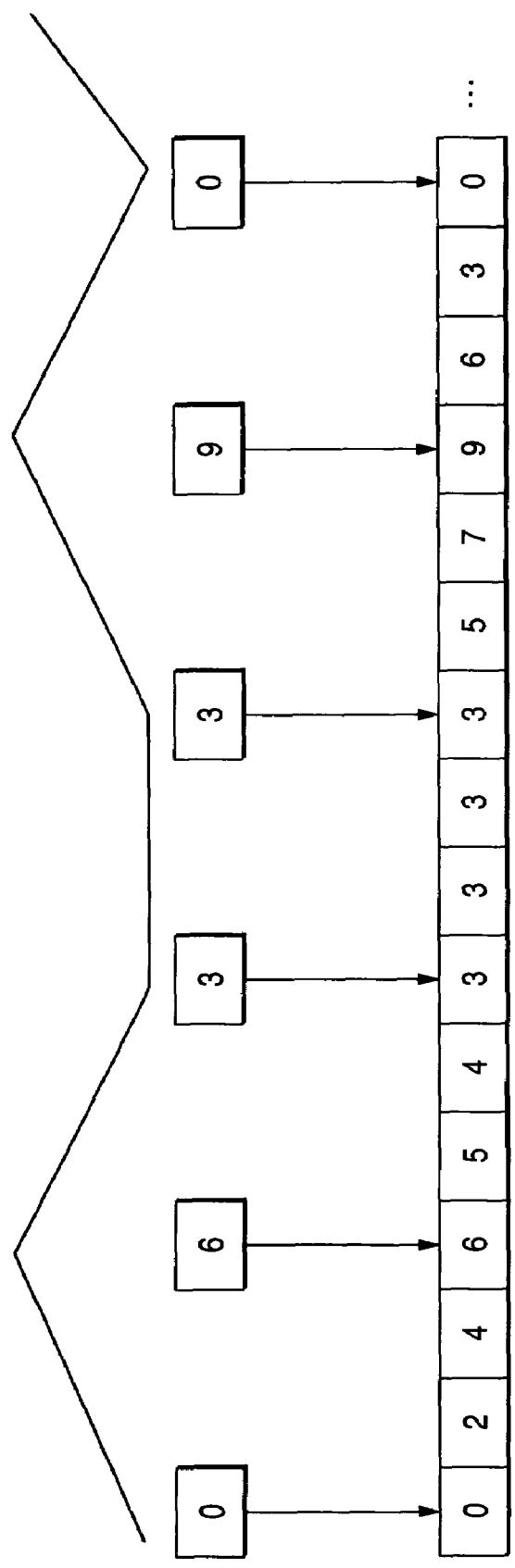
FIG. 4 is an explanatory view (2) showing a process for stretching an extracted row by interpolation.

FIG. 4 is an explanatory view showing the case where intermediate values of the projected image are stretched by three times. That is, for example, interpolation calculation between values "0" and "6" is performed in advance to obtain values "2" and "4". Although FIG. 4 shows an example of a magnifying power of 3, the magnifying power n is decided according to the accuracy of calculation and is generally a real number depending on the beam angle θ or defined uniquely.

Figure 5:
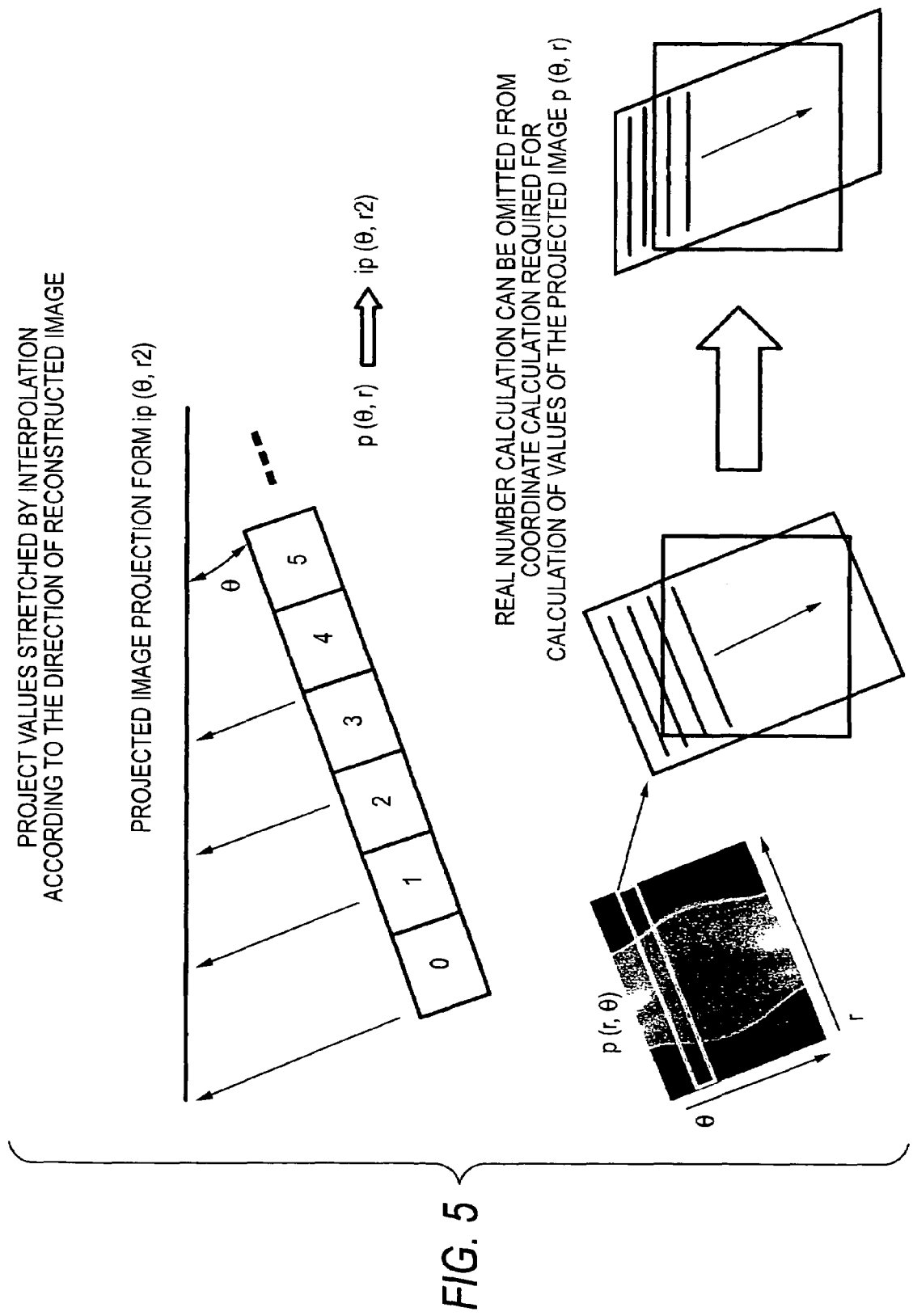
FIG. 5 is an explanatory view showing a process for projecting the interpolated stretched values in accordance with the direction of a reconstructed image.

Then, as shown in FIG. 5, values stretched by interpolation are projected in accordance with the direction of the reconstructed image (step S12). That is, the value of "r" is projected to "r2" in accordance with the x-y coordinate and the angle θ of the r-θ coordinate. As a result, each value is converted from p(θ,r) to ip(θ,r2). When such projection is performed, real number calculation can be omitted from coordinate calculation required for calculation of values of the projected image p(θ,r).

Figure 6:
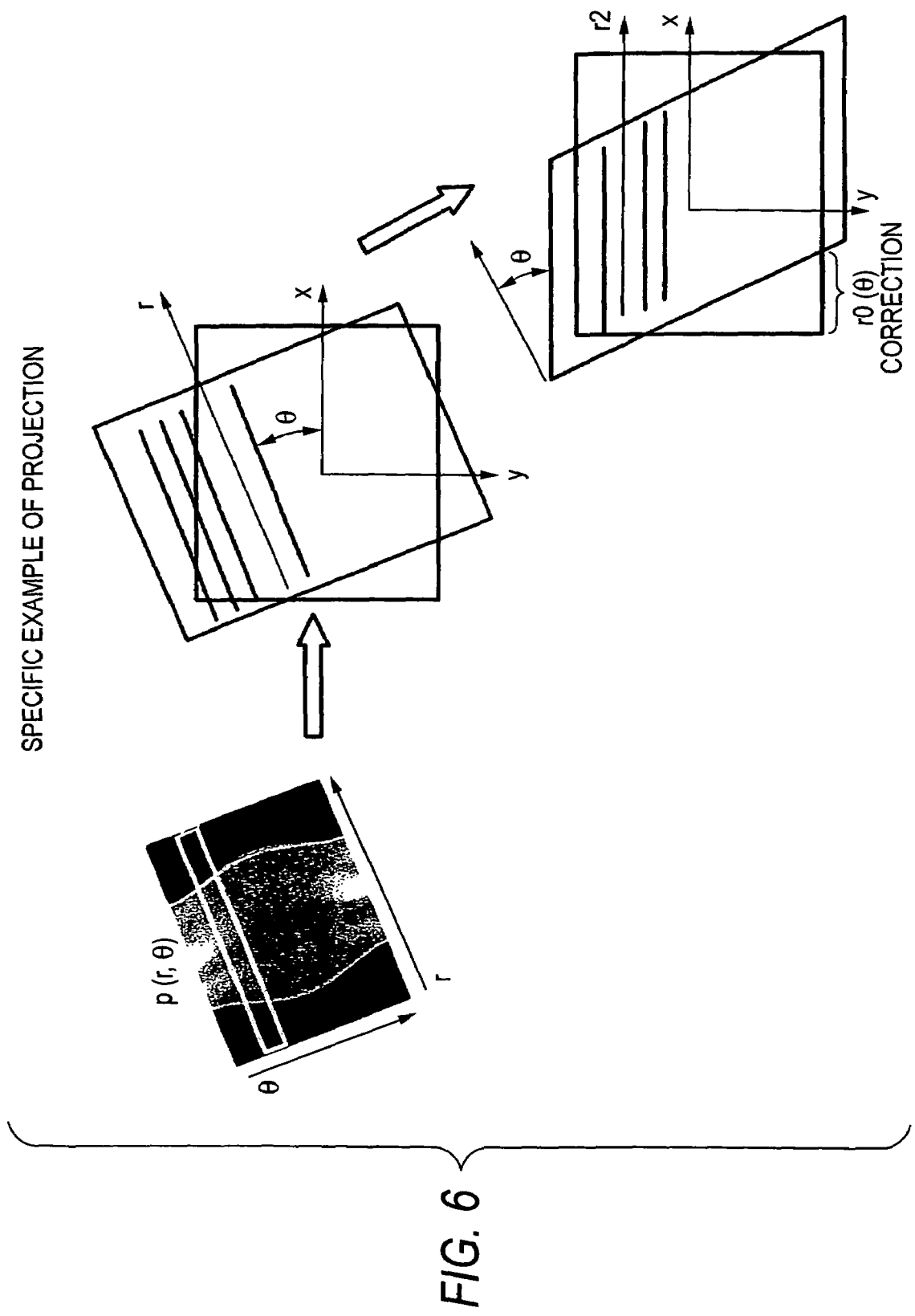
FIG. 6 is an explanatory view showing a specific example of projection.

FIG. 6 is an explanatory view showing a specific example of projection. When ip (θ,r2) is calculated from p(θ,r), r2 is given by the following expression.

$$r2 = (n/\cos\theta) * r$$
$$= (n/\cos\theta) * (x\cos\theta + y\sin\theta)$$
$$= nx + n\tan\theta y$$

When n tan θy is rounded to an integer j, the following simple calculation is obtained.

$$r2 = nx + j$$

This form is referred to as projected image projection form ip(θ,r2).

Figure 7:
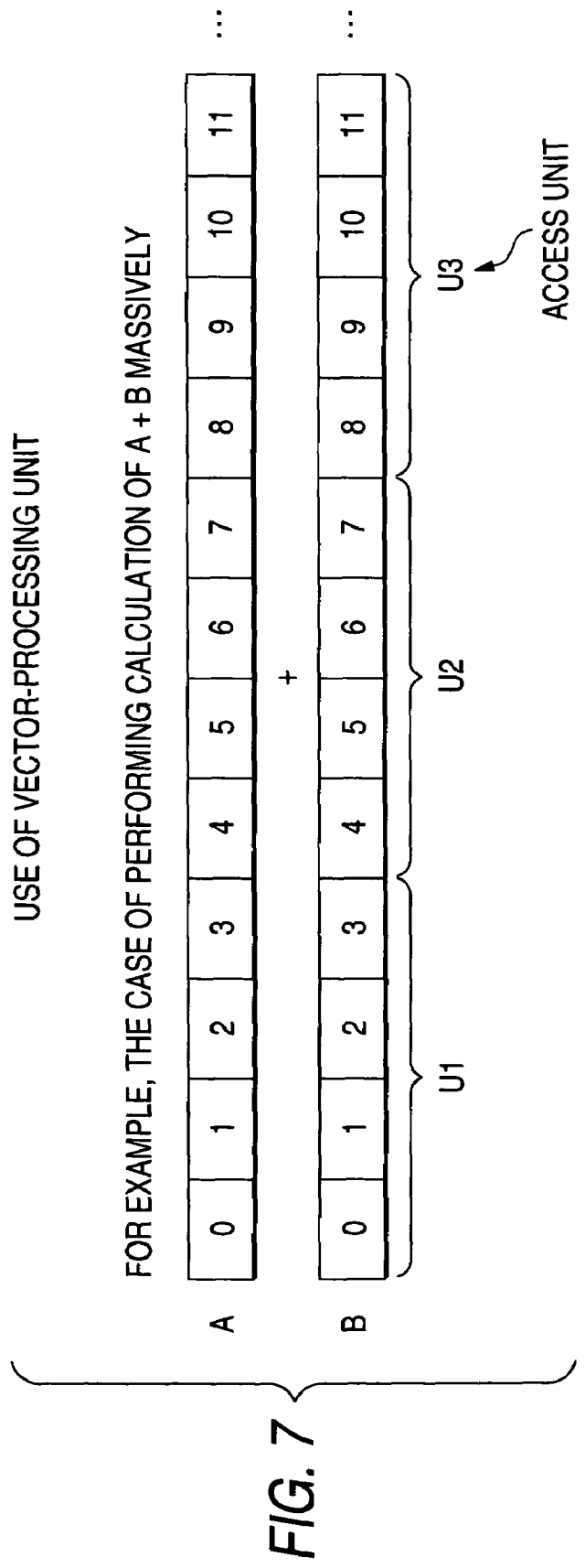
FIG. 7 is a view for explaining use of a vector-processing unit.

Each data of the projected image projection form ip(θ,r2) is calculated by a vector-processing unit. FIG. 7 is an explanatory view showing the case where the vector-processing unit is used. The vector-processing unit operates efficiently when calculation data are adjacent to one another. Accordingly, the speed of calculation can be increased when data are packed according to the vector-processing unit.

The term "vector-processing unit" used herein means a unit by which a plurality of calculations of the same kind can be executed simultaneously with one instruction.

For example, when calculation of A+B are ready to be performed massively by the vector-processing unit which can calculate every four data, four-data packs U1(0 1 2 3), U2(4 5 6 7), U3(8 9 10 11), . . . as access units can be processed collectively as shown in FIG. 7. Accordingly, the speed of calculation can be increased by four times logically compared with the case where data are processed one by one. It is however impossible to use the vector-processing unit if data are not gathered to fours as shown in FIG. 7.

Figure 8:
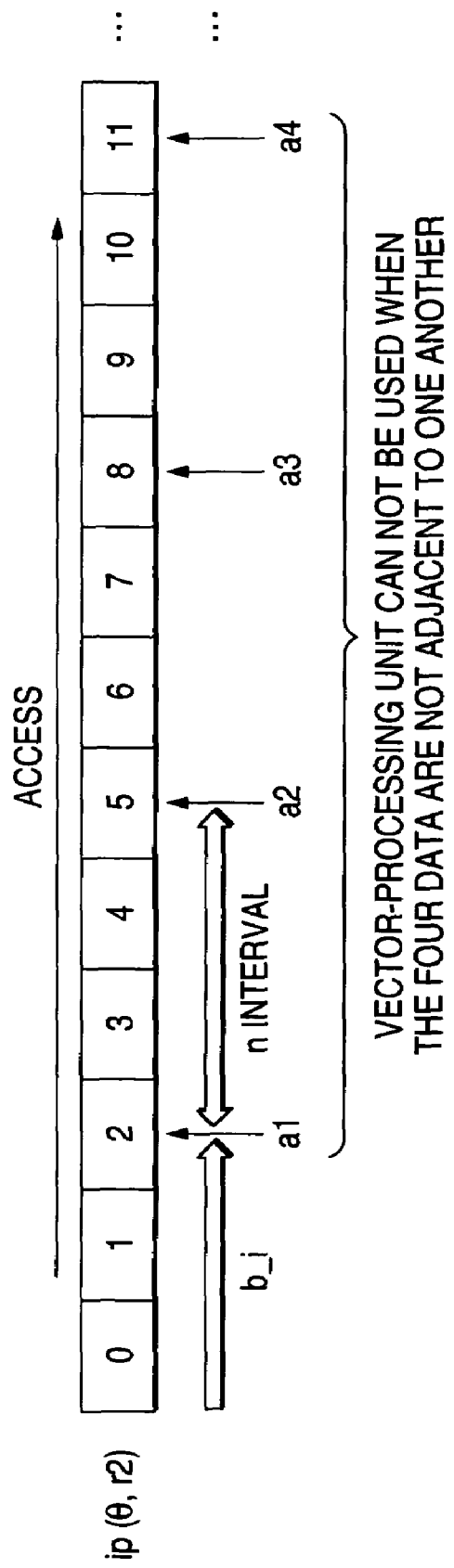
FIG. 8 is a view for explaining a problem in use of the vector-processing unit for back projection calculation.

FIG. 8 is a view for explaining a problem in use of the vector-processing unit for back projection calculation. The problem in using the vector-processing unit occurs in back projection calculation using the projected image projection form ip when data to be calculated continuously are not adjacently arranged.

This is because data in the projected image projection form ip need to be accessed at intervals of n as represented by a1, a2, a3, . . . in FIG. 8 on the basis of the calculation formula of projection: r2=nx+j. Accordingly, it is impossible to use the vector-processing unit for back projection calculation if the four data a1, a2, a3 and a4 to be accessed are not adjacent to one another.

Figure 9:
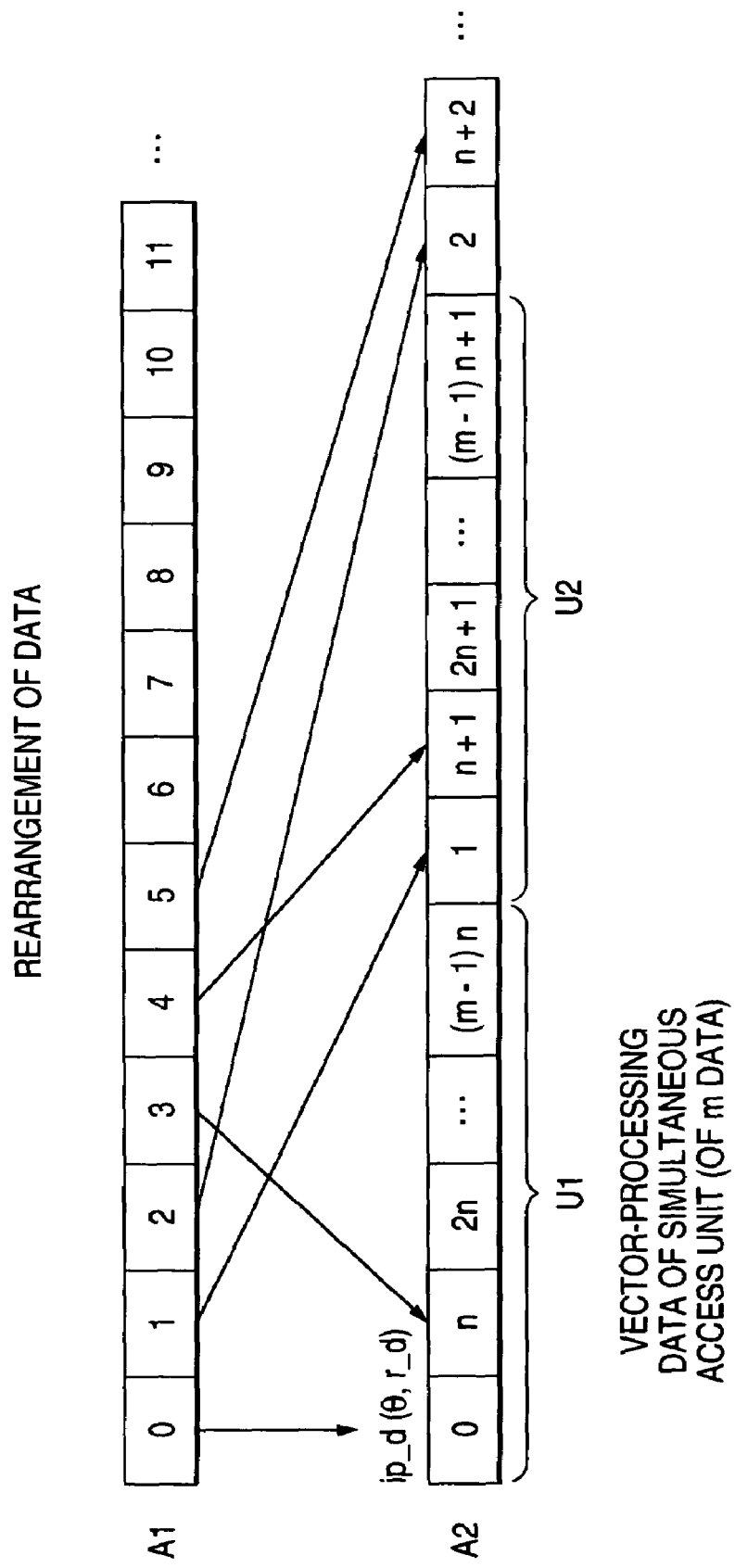
FIG. 9 is an explanatory view showing the case where a simple rearrangement of data is performed.

Therefore, data are rearranged so that the vector-processing unit can be used for performing back projection calculation efficiently (step S13 in FIG. 2). FIG. 9 is an explanatory view showing the case of one unsatisfactory where a simple rearrangement of data is performed. That is, according to the rearrangement of data shown in FIG. 9, data of A1 are rearranged so that m data to be calculated simultaneously are gathered to one place. In this case, when data in A1 are rearranged on the basis of the expression ip_d(θ,r_d), A2 is obtained. Although A2 is obtained by rearranging data of A1 so as to gather the data as vector-processing data U1, U2, . . . each of which is a simultaneous access unit (of m data), it may be impossible to operate the vector-processing unit sufficiently only with such a simple data rearrangement.

Figure 10:
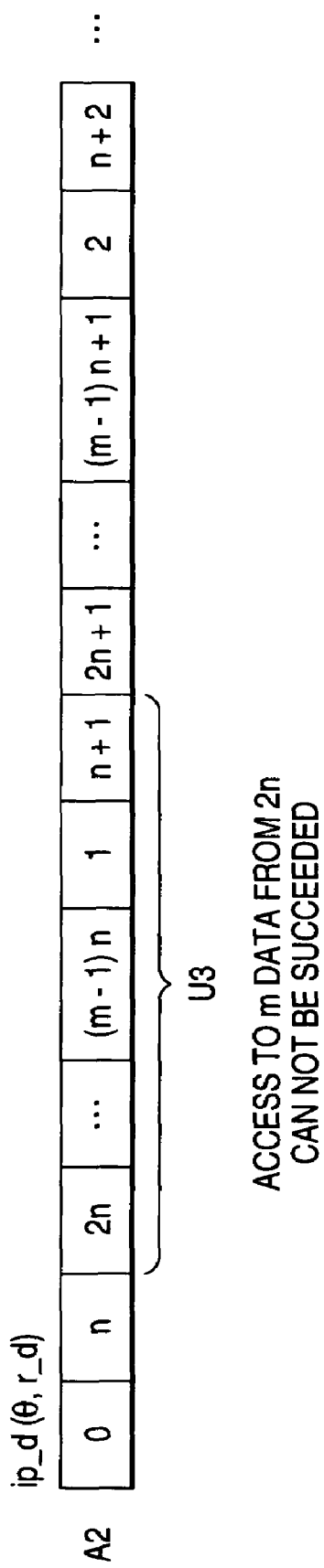
FIG. 10 is an explanatory view showing the case where vector-processing data U3 in A2 is accessed.

FIG. 10 shows the case where vector-processing data U3 of A2 is accessed. Although A2 is obtained by rearranging data of A1 so as to gather the data as vector-processing data U1, U2, . . . as shown in FIG. 9, data which should be calculated are not contained in the vector-processing data U3 which is a combination of different data.

In a practical vector operation, it is preferable that starting data in the starting position of the arithmetic operation is appropriately arranged (aligned) on a boundary position of a memory. However, it is impossible to align all starting positions to the boundary position of the memory only by changing data placement. It is therefore necessary to make the data redundant so that the same value in the data appears in a plurality of positions. Then, data in all starting positions j can be arranged on the boundary position of the memory.

Figure 11:
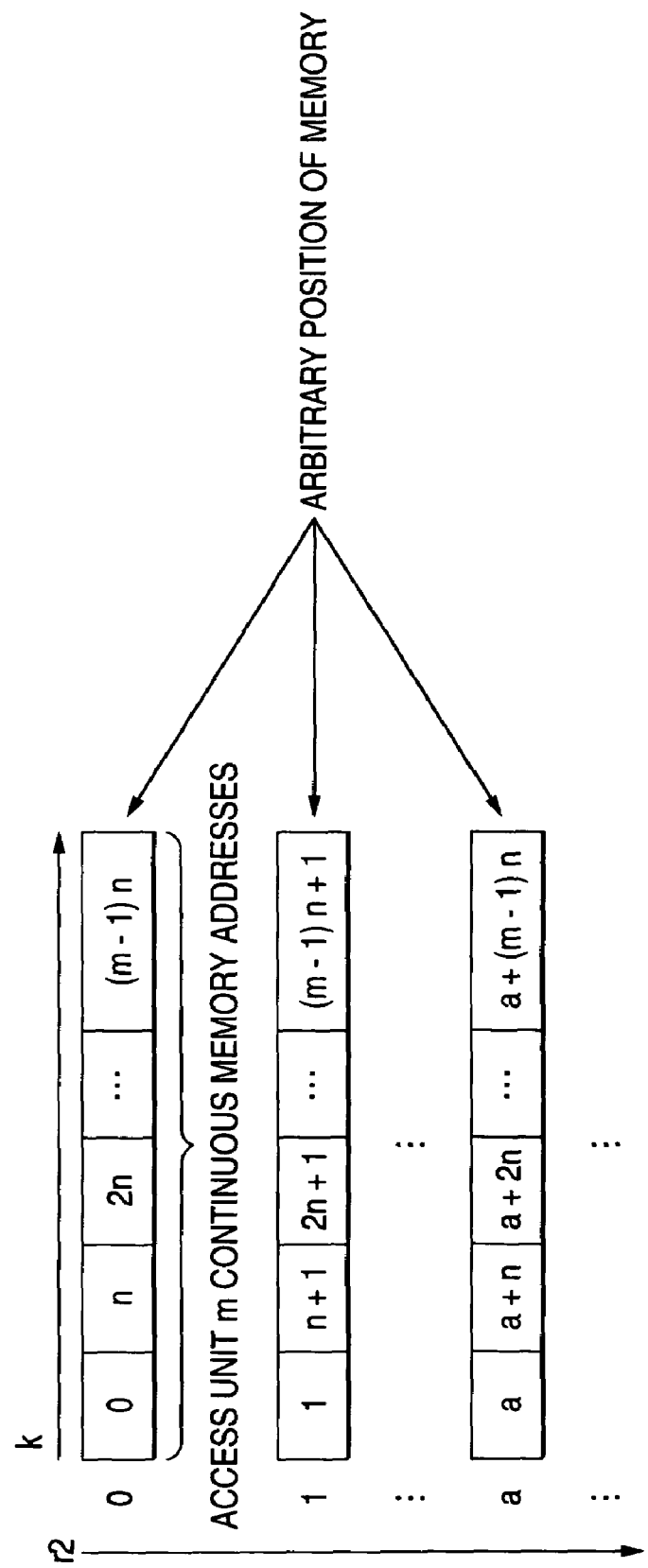
FIG. 11 is an explanatory view showing a projected image redundant arrangement form ip2(θ,r2,k) in which data is rearranged with redundancy in the first embodiment.

FIG. 11 is an explanatory view showing a projected image redundant arrangement form ip2(θ,r2,k) in which data is rearranged with redundancy. In the projected image redundant arrangement form ip2(θ,r2,k), r2 is the same as r2 in the projected image projection form ip(θ,r2), and k designates a data component formed with redundancy. When each access unit is arranged continuously on the memory in this manner, the vector operation can be performed accurately.

Figure 12:
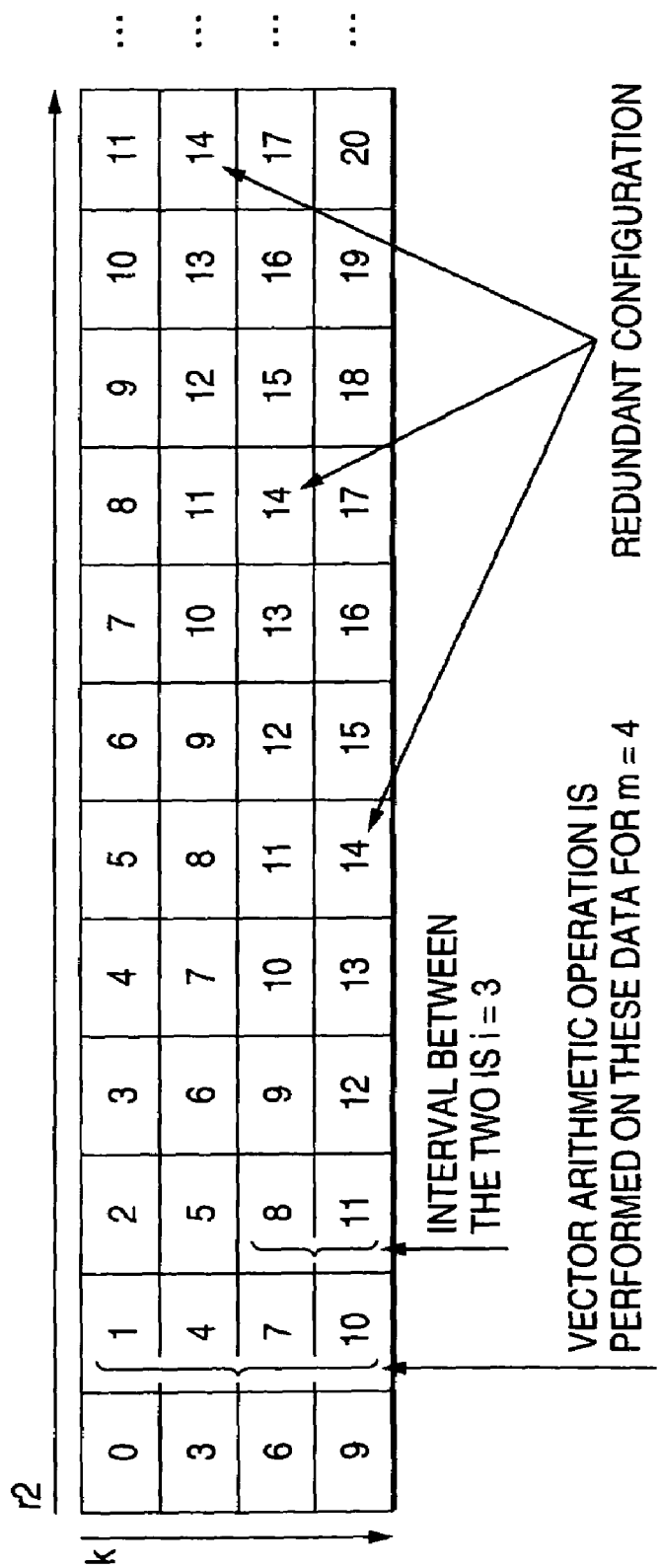
FIG. 12 is an explanatory view showing an example of the projected image redundant arrangement form in the case of m=4 in which m is the number of simultaneous calculation number (i.e. the multiple number for redundancy), and i=3 in which i is the access interval in the first embodiment.

FIG. 12 is an example of the projected image redundant arrangement form in the case of m=4 in which m is the number of simultaneous calculation number (i.e. the multiple number for redundancy), and i=3 in which i is the access interval. That is, four data which can be calculated simultaneously are arranged in the first column at intervals of 3 as represented by "0, 3, 6, 9". This configuration forms such a redundant configuration that each value, e.g. "14" is quadruplicated in accordance with the data interval. Although this embodiment has been described on the case where the magnifying power n is equal to the access interval i on the assumption that the width of the projected image is equal to the width of the back projected image, the invention can be achieved in the same manner as described above even when the magnifying power is not equal to the access interval.

In the related art, back projection calculation was performed on the data only in the uppermost row in the table shown in FIG. 12. In this embodiment, respective data are configured in this form so that a vector operation can be performed for every four data. Accordingly, data for one-column are arranged on continuous addresses (access unit), so that efficient back projection calculation can be performed.

Figure 13:
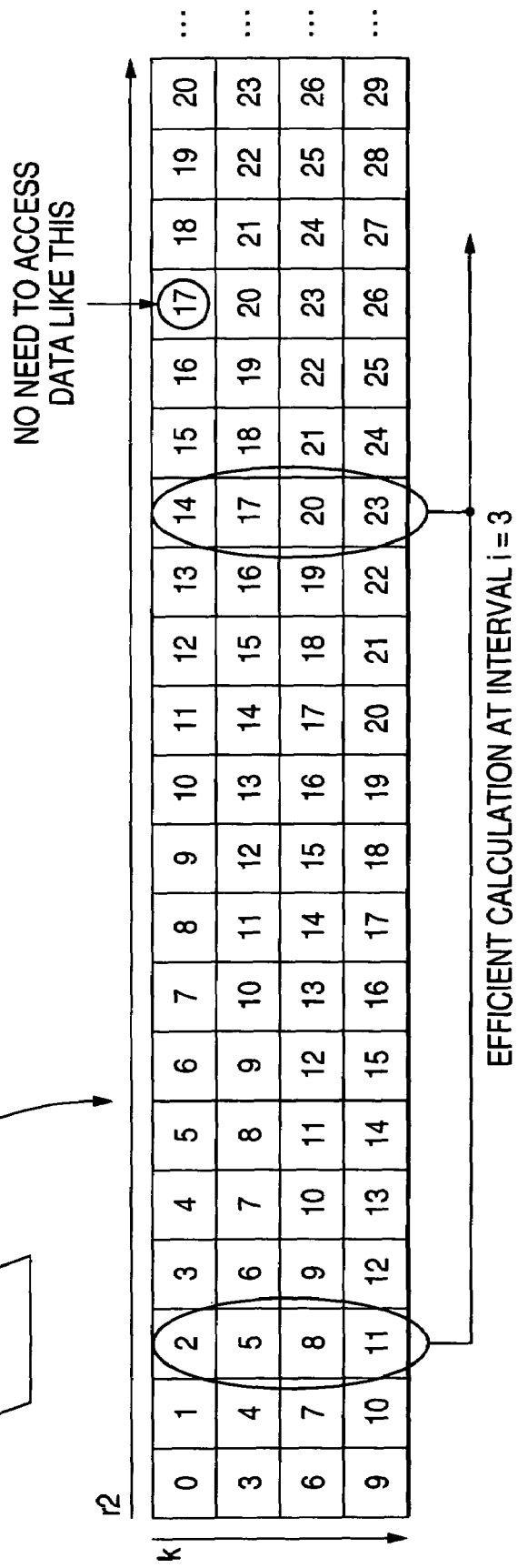
FIG. 13 is an explanatory view showing a state in which back projection calculation is performed for a certain line at a certain angle in the first embodiment.

FIG. 13 is an explanatory view showing a state in which back projection calculation is performed for a certain line at a certain angle. For example, to process data in the position of r2=2 in each line at an angle of θ, every four data (2, 5, 8, 11), (14, 17, 20, 23), . . . in the projected image redundant arrangement form can be accessed continuously in back projection calculation, so that efficiency in back projection calculation is improved.

Figure 14:
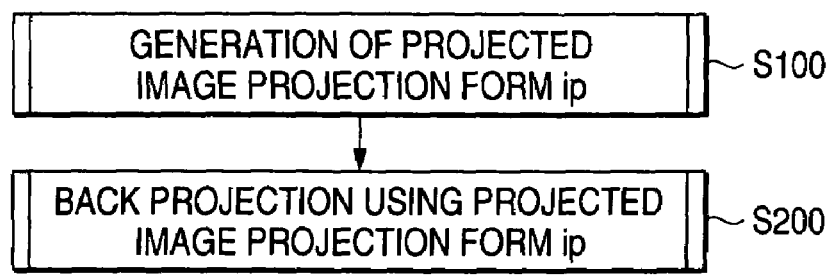
FIG. 14 is a flow chart showing an overall flow of back projection calculation using a projected image projection form according to the first embodiment.

Next, each step of the back projection calculation according to this embodiment will be described with reference to a flow chart. FIG. 14 is a flow chart showing an overall flow of back projection calculation using a projected image projection form according to the first embodiment. The back projection calculation according to this embodiment can be separated into generation of a projected image projection form ip (step S100) and back projection using the projected image projection form ip (step S200).

Figure 15:
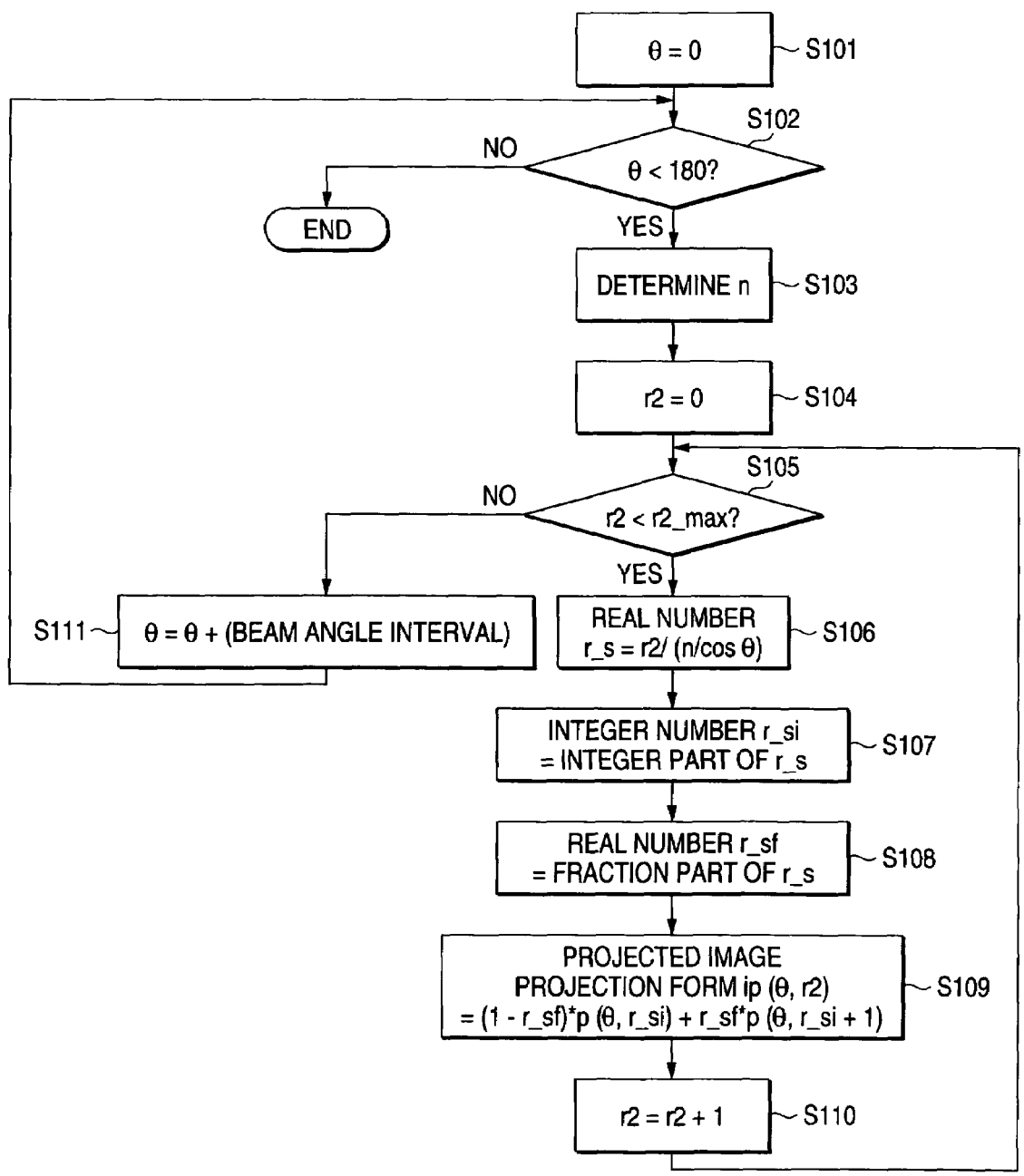
FIG. 15 is a detailed flow chart showing generation of the projected image projection form ip in the first embodiment.

FIG. 15 is a detailed flow chart showing generation of a projected image projection form ip in step S100. In order to generate the projected image projection form ip in a beam angle range of 0≦θ≦180°, first, θ is set as zero (step S101). Then, the value of angle θ is compared with 180° (step 102), and if θ<180°, the magnifying power n in interpolation calculation is determined (step S103).

Then, r2 is set as zero to calculate interpolation values for respective data (step S104). In loop calculation, r2 is compared with the maximum value r2_max (step S105). When r2 is smaller than r2_max, real number r_s=r2/(n/cos θ) is calculated (step S106). Integer r_si is set as the integer part of r_s (step S107) and real number r_sf is set as the fraction part of r_s (step S108). Then the projected image projection form ip(θ,r2) is obtained by ip(θ,r2)=(1−r_sf)*p(θ,r_si)+r_sf*p(θ, r_si+1) (step S109). In this embodiment, interpolative stretch and projection are performed simultaneously in this manner, so that each calculation can be performed efficiently.

Then, r2 is incremented by one (step S110) and the current processing position of this routine goes back to step S105 to repeat the aforementioned calculation until r2 reaches r2_max. When the calculation at this beam angle θ is completed, the beam angle interval is added to the angle θ (step S111) and the current processing position of this routine goes back to step S102 to repeat the aforementioned calculation until the beam angle θ reaches 180°. Thus, the projected image projection form ip(θ,r2) is obtained.

Figure 16:
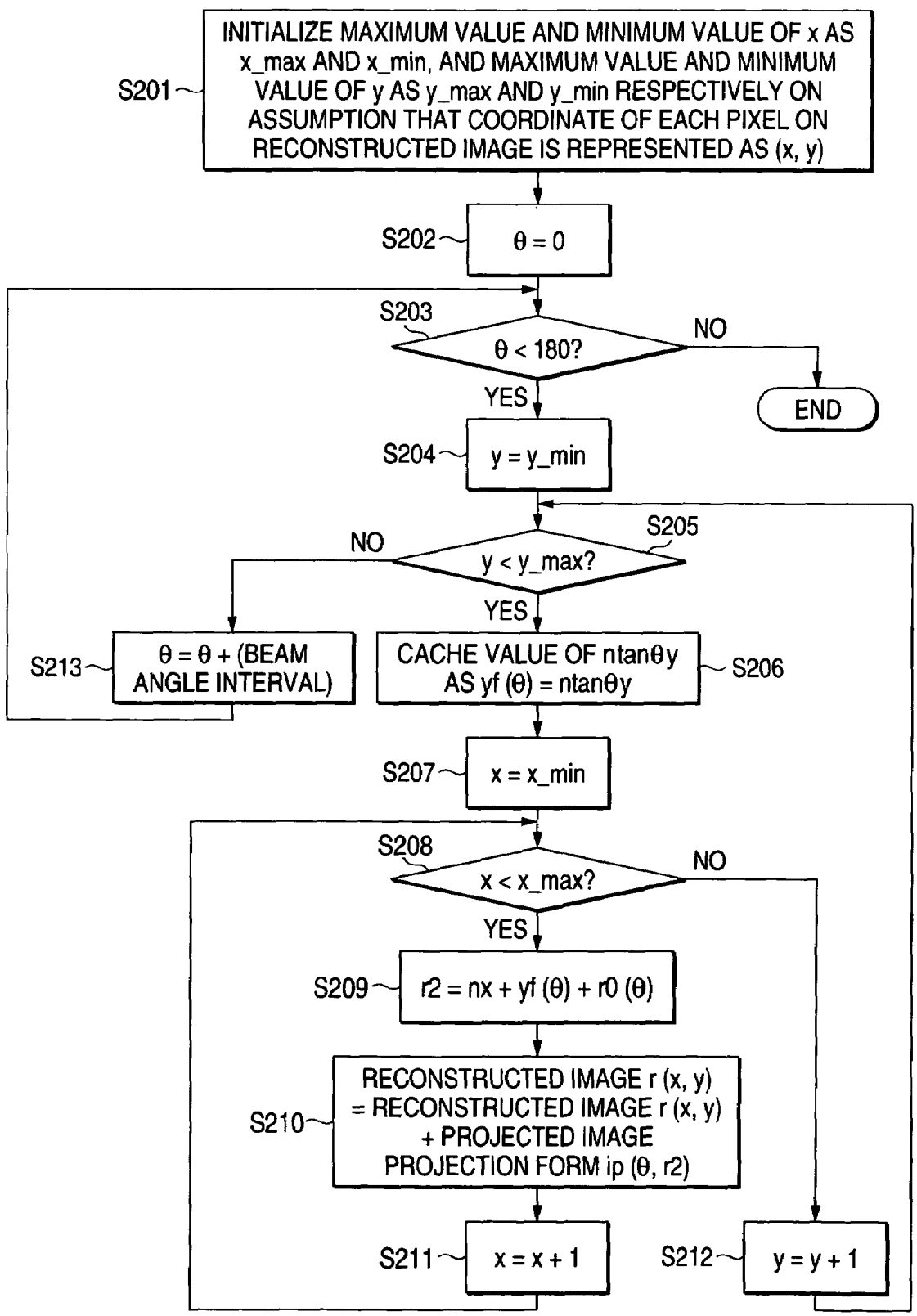
FIG. 16 is a detailed flow chart showing back projection calculation using the projected image projection form ip in the first embodiment.

FIG. 16 is a detailed flow chart of back projection calculation using the projected image projection form ip in step S200 in FIG. 14. In the back projection calculation using the projected image projection form ip, first, the maximum value and minimum value of x are initialized as x_max and x_min, and the maximum value and minimum value of y are initialized as y_max and y_min respectively, on the assumption that the coordinate of each pixel on a reconstructed image is represented as (x,y) (step S201). Then, the angle θ is set as zero (step S202), compared with 180° (step S203), and when the angle θ is smaller than 180°, the y coordinate is set as y=y_min (step S204).

Then, y is compared with y_max (step S205). When y is smaller than y_max, the value of n tan θy is cached as yf(θ)=n tan θy (step S206). Then, the x coordinate is set as x=x_min (step S207), x is compared with x_max (step S208), and when x is smaller than x_max, r2 is calculated by r2=nx+yf(θ)+r0 (θ) (step S209).

Then, the reconstructed image r(x, y)=the reconstructed image r(x,y)+the projected image projection form ip(θ,r2) is calculated (step S210). Then, the value of x coordinate is incremented by one (step S211) and the current processing position of this routine goes back to step S208 to perform the aforementioned calculation for all the range of the x coordinate. When the calculation for x coordinate is completed, the value of y coordinate is incremented by one (step S212) and the current processing position of this routine goes back to step S205 to perform the aforementioned calculation for all the range of the y coordinate. When the calculation for y coordinate is completed, the beam angle interval is added to the angle θ (step S213) and the current processing position of this routine goes back to step S203 to repeat the aforementioned calculation for the whole range until the angle θ reaches 180°.

In this embodiment, interpolation calculation at the time of coordinate calculation is removed in step S209. However, x is incremented one by one at each cycle. Accordingly, if each access unit is composed of n data, there is a problem that a vector operation cannot be performed directly.

Figure 17:
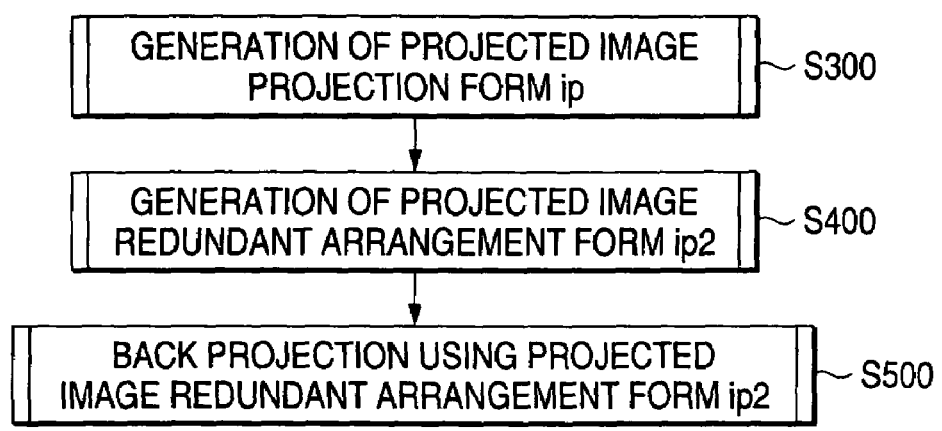
FIG. 17 is an overall flow chart showing back projection calculation using the projected image redundant arrangement form for performing back projection calculation efficiently in the first embodiment.

FIG. 17 is an overall flow chart showing back projection calculation using a projected image redundant arrangement form for performing back projection calculation efficiently while solving the abovementioned problem. The back projection calculation according to this embodiment includes generation of a projected image projection form ip (step S300), generation of a projected image redundant arrangement form ip2 (step S400), and back projection using the projected image redundant arrangement form ip2 (step S500). Incidentally, the generation of the projected image projection form ip in step 300 is same as that in step S100 in FIG. 14. The detailed flow chart of the step 300 is same as shown in FIG. 15.

Figure 18:
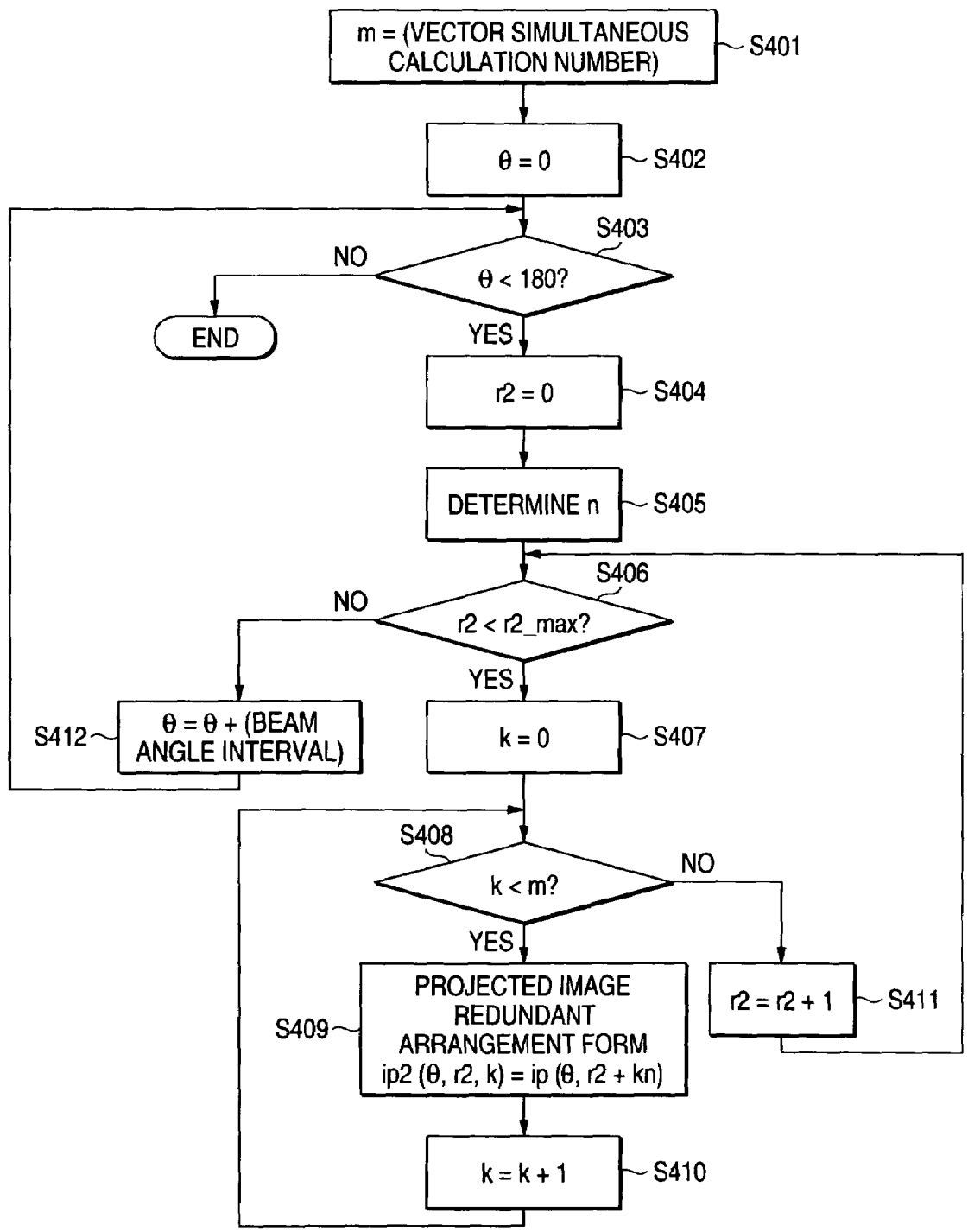
FIG. 18 is a detailed flow chart showing generation of the projected image redundant arrangement form ip2 in the first embodiment.

FIG. 18 is a detailed flow chart showing the generation of the projected image redundant arrangement form ip2 in the step S400 in FIG. 17. In FIG. 18, data are rearranged to a form adapted to a vector operation. First, multiple number m for redundancy is set as vector simultaneous calculation number (step S401), and beam angle θ is set as zero (step S402). Then, the angle θ is compared with 180° (step S403), and when the angle θ is smaller than 180°, r2 is set as zero (step S404). Then, n is determined to the same value as used when the projected image projection form ip was generated (step S405).

Then, r2 is compared with r2_max (step S406). When r2 is smaller than r2_max, k is set as zero (step S407). Then, k is compared with m (step S408). When k is smaller than m, the projected image redundant arrangement form ip2(θ,r2,k) is calculated by ip2(θ,r2,k)=ip(θ,r2+kn) (step 409). Then, k is incremented by one (step S410) and the current processing position of this routine goes back to step S408. Each redundant portion is generated in this loop.

When the aforementioned calculation is then completed, r2 is incremented by one (step S411) and the current processing position of this routine goes back to step S406 to repeat the loop calculation concerning r2. Then, the beam angle interval is added to the beam angle θ (step S412) to repeat the aforementioned calculation.

Figure 19:
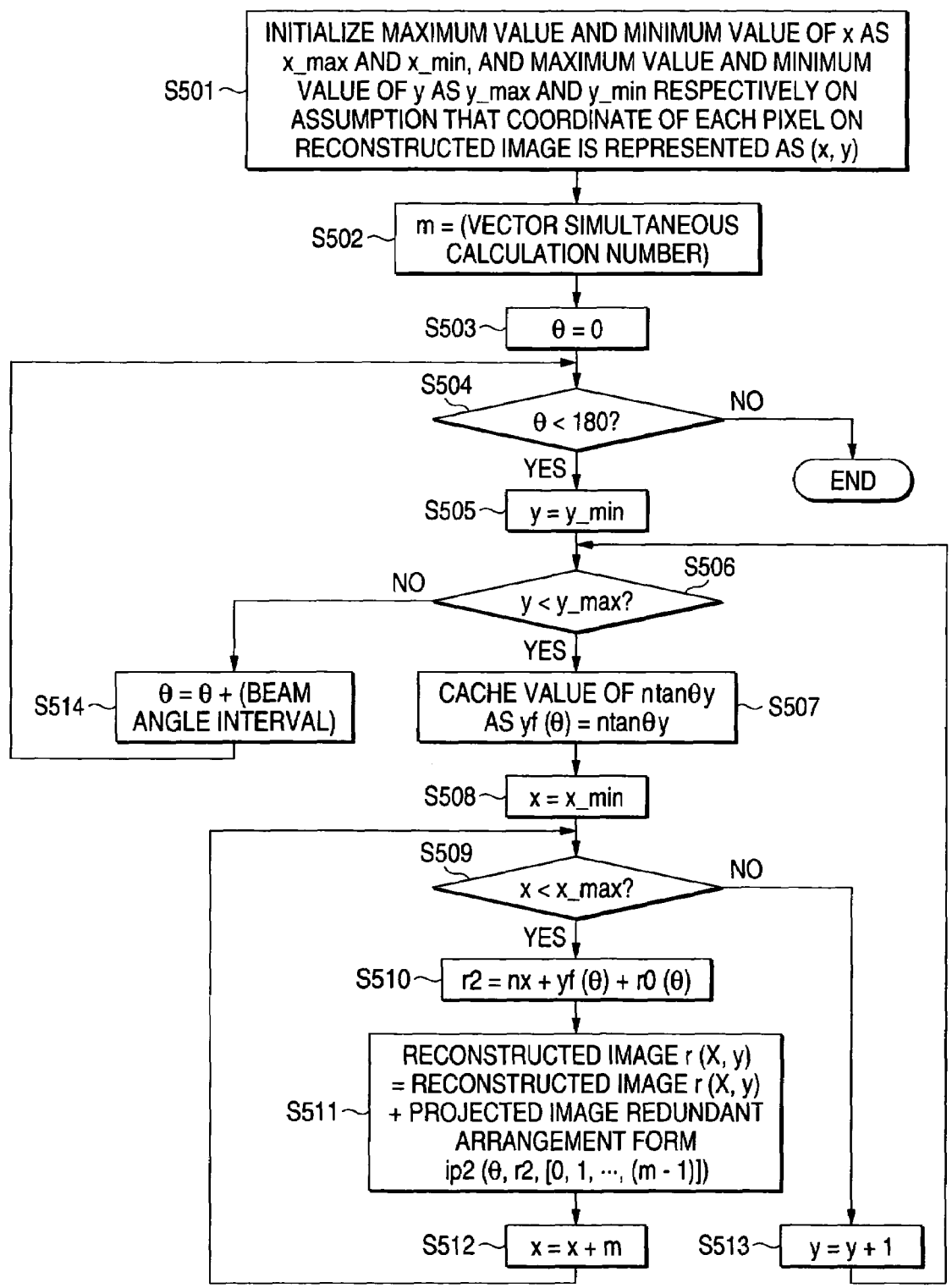
FIG. 19 is a detailed flow chart showing back projection calculation using the projected image redundant arrangement form ip2 in the first embodiment.

FIG. 19 is a detailed flow chart showing back projection calculation using the projected image redundant arrangement form ip2 in the step S500 in FIG. 17. In FIG. 19, first, maximum value and minimum value of x are initialized as x_max and x_min, and maximum value and minimum value of y are initialized as y_max and y_min respectively on the assumption that the coordinate of each pixel on a reconstructed image is represented as (x,y) (step S501). Then, the multiple number m for redundancy is set as vector simultaneous calculation number (step S502). The angle θ is set as zero (step S503), compared with 180° (step S504), and when the angle θ is smaller than 180°, y coordinate is set as y=y_min (step S505).

Then, y is compared with y_max (step S506). When y is smaller than y_max, the value of n tan θy is cached as yf(θ)=n tan θy (step S507). Then, x coordinate is set as x=x_min (step S508), and x is compared with x_max (step S509). When x is smaller than x_max, r2 is calculated by r2=nx+yf(θ)+r0(θ) (step S510).

Then, the reconstructed image r(X, y)=the reconstructed image r(X,y)+the projected image redundant arrangement form ip2(θ,r2, [0, 1, . . . , m−1]) is calculated (step S511). Herein, X=x, x+1, . . . , x+m−1. In this step S511, calculation can be made efficiently because m arithmetic operations can be performed simultaneously by a vector operation.

Then, m is added to the value of the x coordinate (step S512) and the current processing position of this routine goes back to step S509 to perform the aforementioned calculation for all the range of x coordinate. When the calculation for x coordinate is completed, the value of y coordinate is incremented by one (step S513) and the current processing position of this routine goes back to step S506 to perform the aforementioned calculation for all the range of y coordinate. When the calculation for y coordinate is completed, the beam angle interval is added to the angle θ (step S514) and the current processing position of this routine goes back to step S504 to repeat the aforementioned calculation for the whole range until the angle θ reaches 180°.

As described above, in accordance with the back projection calculation method of this embodiment, a projected image redundant arrangement form in which projection data is arranged so as to be redundant and gathered as access units is generated. As a vector operation is carried out for the projection data arranged in the projected image redundant arrangement form, the vector operation can be performed efficiently while the real-number arithmetic operations required for addressing is omitted. As a result, the speed of back projection calculation can be improved.

Second Embodiment

A back projection calculation method according to a second embodiment of the invention will be described below. In the back projection calculation method according to this embodiment, projection data is projected after rearranged in accordance with the vector operation, and interpolation calculation is performed to improve image quality. In addition, projection data is stretched by interpolation so that calculation speed can be improved while image quality is maintained high. According to the back projection calculation method of this embodiment, both memory utilizing efficiency and memory access efficiency can be improved because some part of the redundant arrangement form can be easily omitted compared with the first embodiment.

Figure 20A:
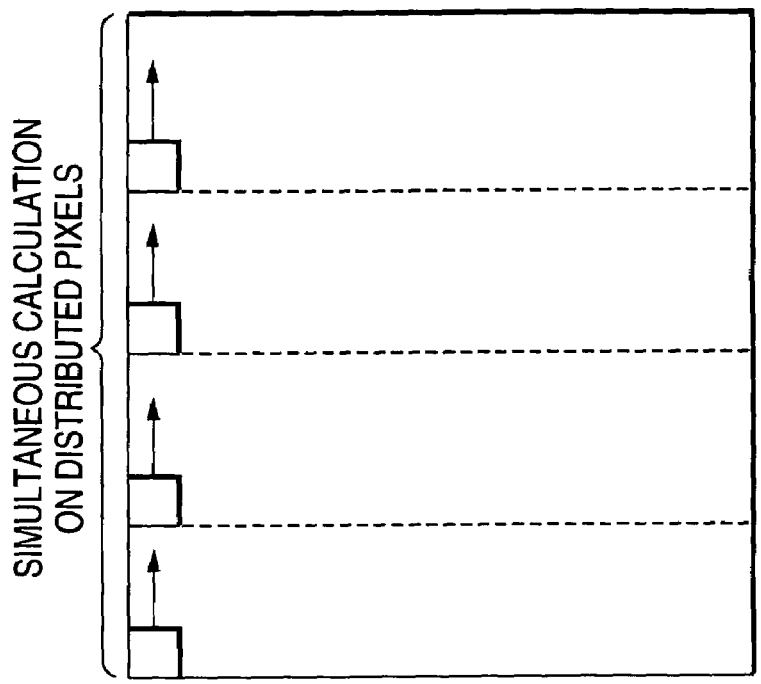
FIGS. 20A and 20B are views for explaining change in the way of rearrangement when changing the way of vector operation in a second embodiment of the invention.
Figure 20B:
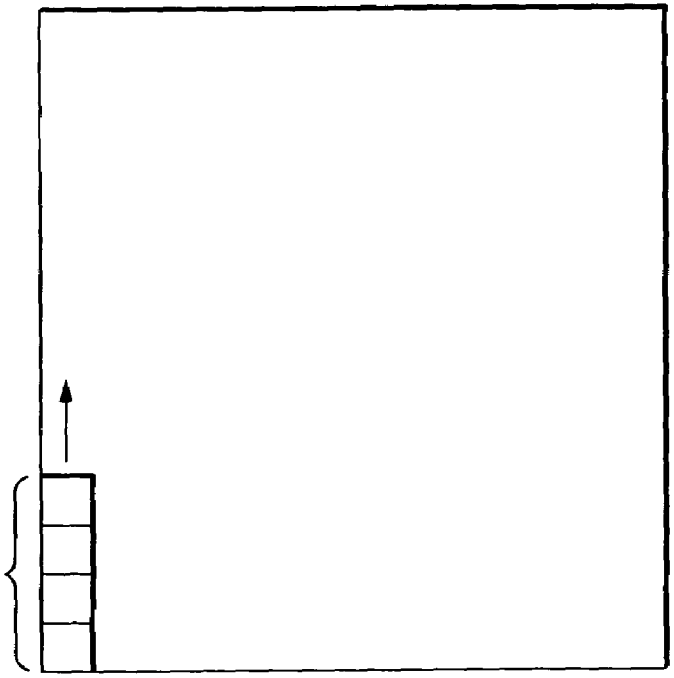

FIGS. 20A and 20B are views for explaining the outline of the back projection calculation method according to this embodiment. FIG. 20A shows the concept of a vector operation in the first embodiment. For example, in FIG. 20A, simultaneous calculation is performed on four continuous pixels. On the contrary, in this embodiment, simultaneous calculation is performed on distributed pixels as shown in FIG. 20B. In data arrangement assuming such calculation, access unit is distributed over separate parts of an image.

FIGS. 21A and 21B are views for explaining data arrangement in this embodiment. FIG. 21A is an example of data arrangement as shown in FIG. 12 in the first embodiment showing the projected image redundant arrangement form when simultaneous calculation number m=4 and access interval i=3. FIG. 21B is an example of data arrangement in this embodiment showing the projected image redundant arrangement form when simultaneous calculation number m=4 and access interval i=1. As the number of horizontal pixels in back projected image is 32, and the pattern of redundant arrangement is determined by the calculation of 32÷m=8, redundant data are arranged in units of eight elements. According to this configuration, all data of horizontal pixels in back projected image appear in the range of from 0 to 7 on the uppermost row, so that all the necessary data can be acquired by accessing contiguous memory addresses. Thus, data arrangement in this embodiment increases memory access efficiency by making access interval equal to 1.

Figure 22A:
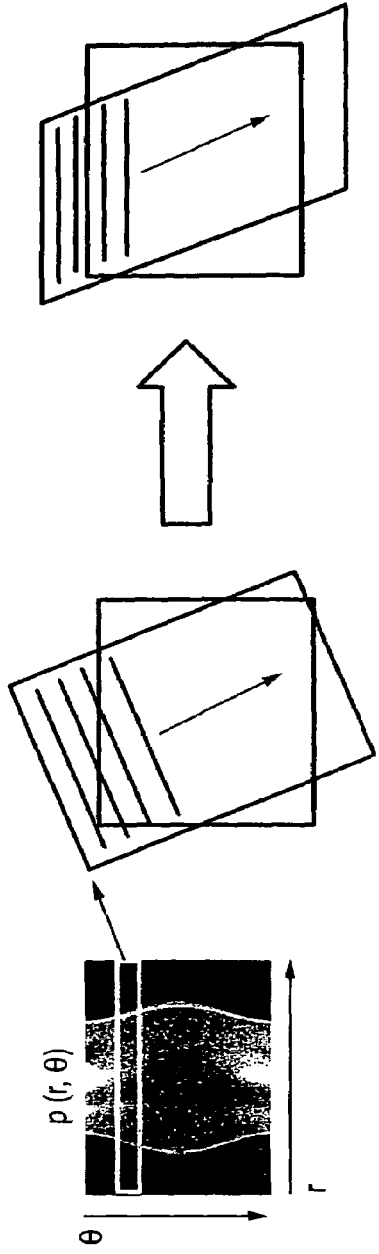
FIGS. 22A and 22B are views for explaining the way of rearrangement and a projection method considering the way of rearrangement in the second embodiment of the invention.
Figure 22B:
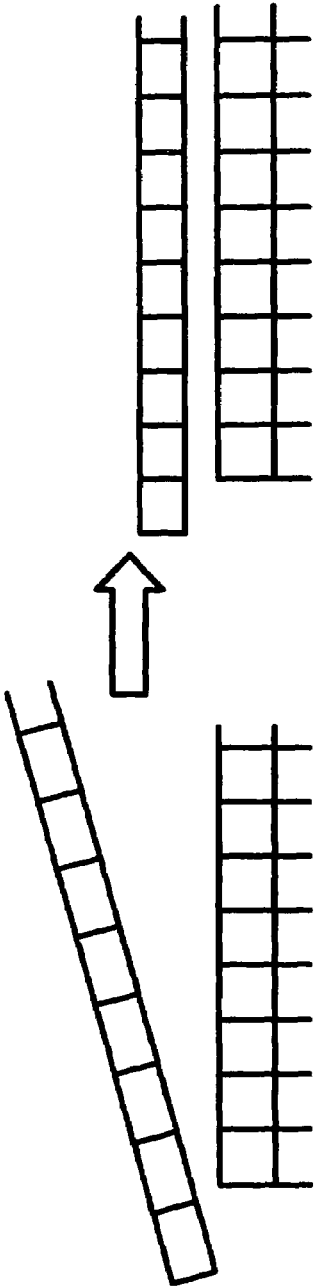

FIGS. 22A and 22B are explanatory views showing the way of rearrangement in this embodiment and a projection method considering the way of rearrangement. In this embodiment, data for one row in the projected image are projected so that pixel pitches are made coincident with one another. This is because a part of coordinate calculation during the calculation can be omitted when pixel pitches coincide with one another.

FIGS. 23A and 23B show an example of data arrangement in this embodiment. In the data arrangement in this embodiment, as shown in FIG. 23A, data are arranged with calculation of distributed positions. Accordingly, unlike the rearrangement method in the first embodiment (FIG. 13), data are arranged continuously. In the data arrangement, redundant portions are gathered in the front and in the rear of the data arrangement.

FIG. 23B shows a projection of the redundant portions considering displacement of each line. Data for one row in the projected image are projected so that pixel pitches are made coincident with one another. Accordingly, coordinate calculation during the calculation can be omitted, so that calculation efficiency can be improved.

As described above, in accordance with the data arrangement of this embodiment, there is no waste of memory access efficiency because the access interval at the time of calculation is 1. Because the redundant portions are attached to the front and the rear of the data arrangement, all necessary data can be acquired by a simple operation of moving the access starting position which is displaced according to each calculation line. Accordingly, it is unnecessary to rearrange data. In this case, the quantity of redundancy (i.e. the quantity of displacement) depends on the beam angle θ, but is not a specific multiple number.

Figure 24:
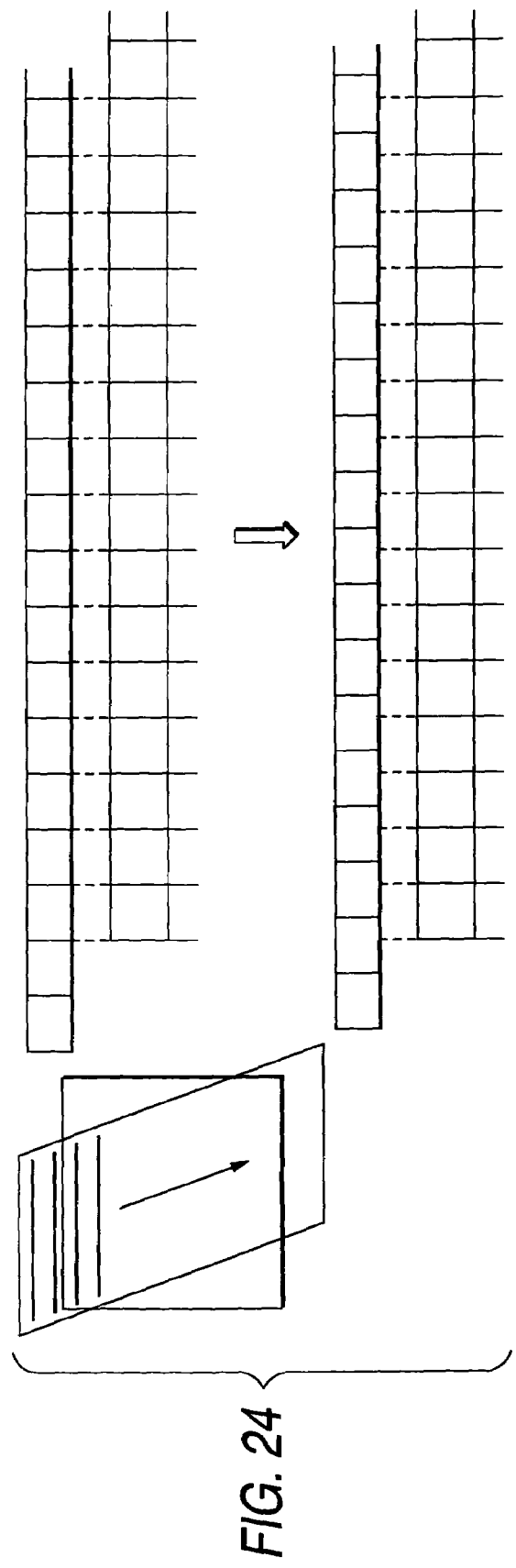
FIG. 24 is a view for explaining improvement in image quality by performing interpolation calculation in the second embodiment of the invention.

However, it is difficult to expect good image quality because interpolation is not performed in this state. That is, if interpolation calculation is not performed as shown in FIG. 24, image quality is lowered because the pixel pitch is not displaced by an integral multiple number when the calculation cycle is moved to the next line.

FIG. 25 is an explanatory view showing interpolation calculation. In the case of linear interpolation, two data are required for interpolation calculation. Each interpolation value in linear interpolation is calculated as f0*α+f1*(1−α) for f0 and f1 shown in FIG. 25. In the expression, α is interpolation coefficient. In the interpolation calculation in this case, interpolation coefficient is constant for each line because the pixel pitch is regular. Accordingly, a vector operation can be performed, so that high-speed processing is possible.

FIGS. 26A and 26B are views for explaining improvement in increasing speed while the image quality is maintained high by performing interpolation. In this case, as shown in FIG. 26B, versions of the projected image redundant arrangement form are generated so that respective data are shifted little by little. This is synonymous with the generation of versions in which the interpolation coefficient α in the interpolation value $f0*α+f1*(1-α)$ changes little by little. That is, this is a process equivalent to stretch in the related art method.

Incidentally, when generating a finite number of versions of the projected image redundant arrangement form shown in FIG. 26B, data approximation is performed. In this case, the interpolation coefficient α in the interpolation value $f0*α+f1*(1-α)$ is uniquely determined for each line. Accordingly, sufficient image quality can be obtained when data are approximated by a suitable version having the nearest α. As data are not simply stretched but structured into versions, calculation speed can be increased without reduction in memory access efficiency. Accordingly, processing can be performed for almost the same time as in the case where interpolation is not performed.

Figure 27:
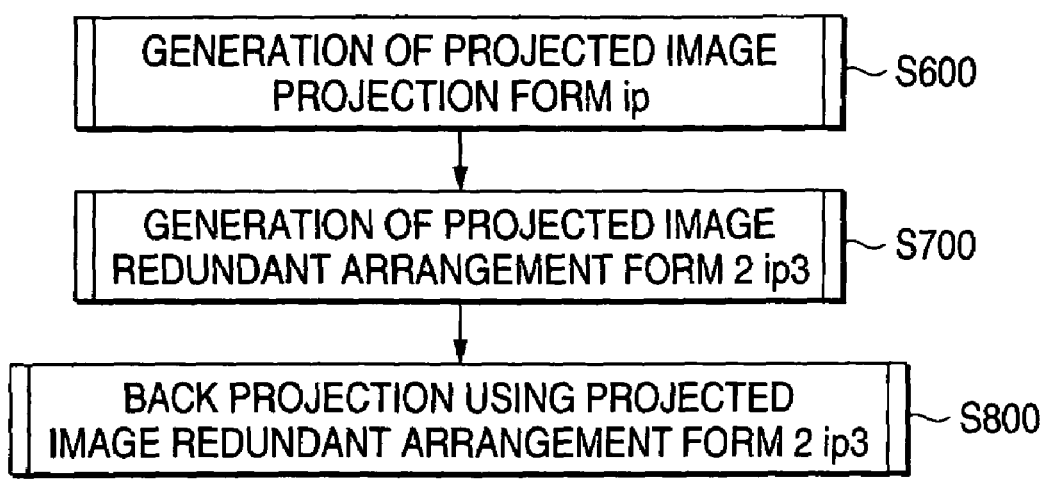
FIG. 27 is an overall flow chart showing back projection calculation using a projected image redundant arrangement form 2 in the second embodiment.

FIG. 27 is an overall flow chart showing back projection calculation using a projected image redundant arrangement form 2 for performing back projection calculation efficiently in this embodiment. The back projection calculation according to this embodiment includes generation of a projected image projection form ip (step S600), generation of a projected image redundant arrangement form 2 ip3 (step S700), and back projection using the projected image redundant arrangement form 2 ip3 (step S800). Incidentally, the generation of the projected image projection form ip in step S600 is the same as that in the step S100 in FIG. 14. The detailed flow chart of the step S600 is the same as shown in FIG. 15.

Figure 28:
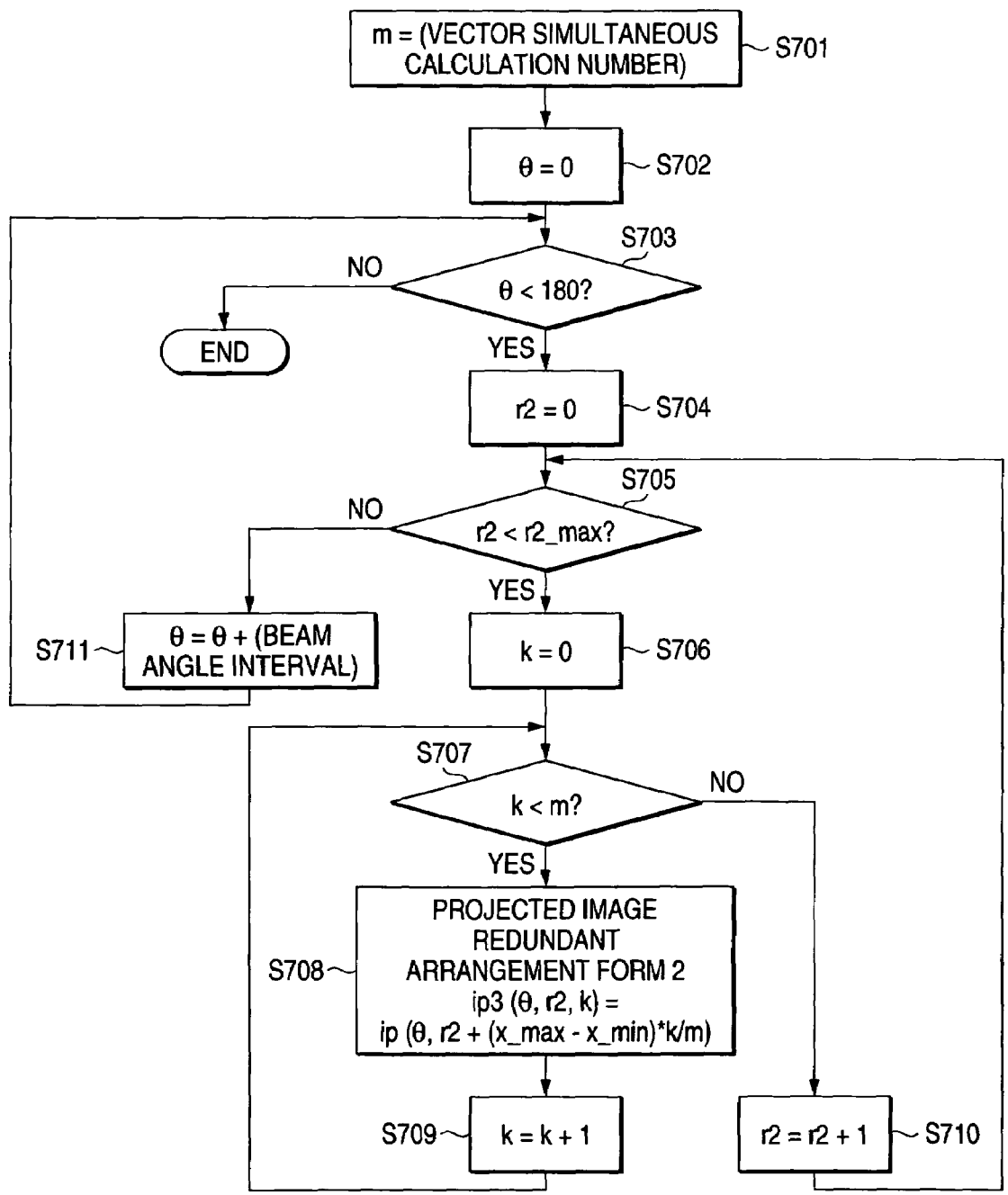
FIG. 28 is a detailed flow chart showing generation of the projected image redundant arrangement form 2 ip3 in the second embodiment.

FIG. 28 is a detailed flow chart showing generation of the projected image redundant arrangement form 2 ip3 in step 700 in FIG. 27. In FIG. 28, data are rearranged in a form adapted to a vector operation. First, the multiple number m for redundancy is set as the vector simultaneous calculation number (step S701), and the beam angle θ is set as zero (step S702). Then, the angle θ is compared with 180° (step S703). When the angle θ is smaller than 180°, r2 is set as zero (step S704).

Then, r2 is compared with r2_max (step S705), and when r2 is smaller than r2_max, k is set as zero (step S706). Then, k is compared with m (step S707). When k is smaller than m, the projected image redundant arrangement form 2 ip3(θ,r2, k)=ip(θ,r2+(x_max−x_min)*k/m) is calculated (step S708). Then, k is incremented by one (step S709) and the current processing position of this routine goes back to step S707. Redundant portions are generated in this loop. Although the step S705 shows calculation up to r2_max, the calculation may be stopped in midstream depending on θ as r2 is not always required for the whole region.

When the aforementioned calculation is then completed, r2 is incremented by one (step S710) and the current processing position of this routine goes back to step S705 to repeat the loop calculation concerning r2. Then, the beam angle interval is added to the beam angle θ (step S711) to repeat the aforementioned calculation until the angle θ reaches 180°.

Figure 29:
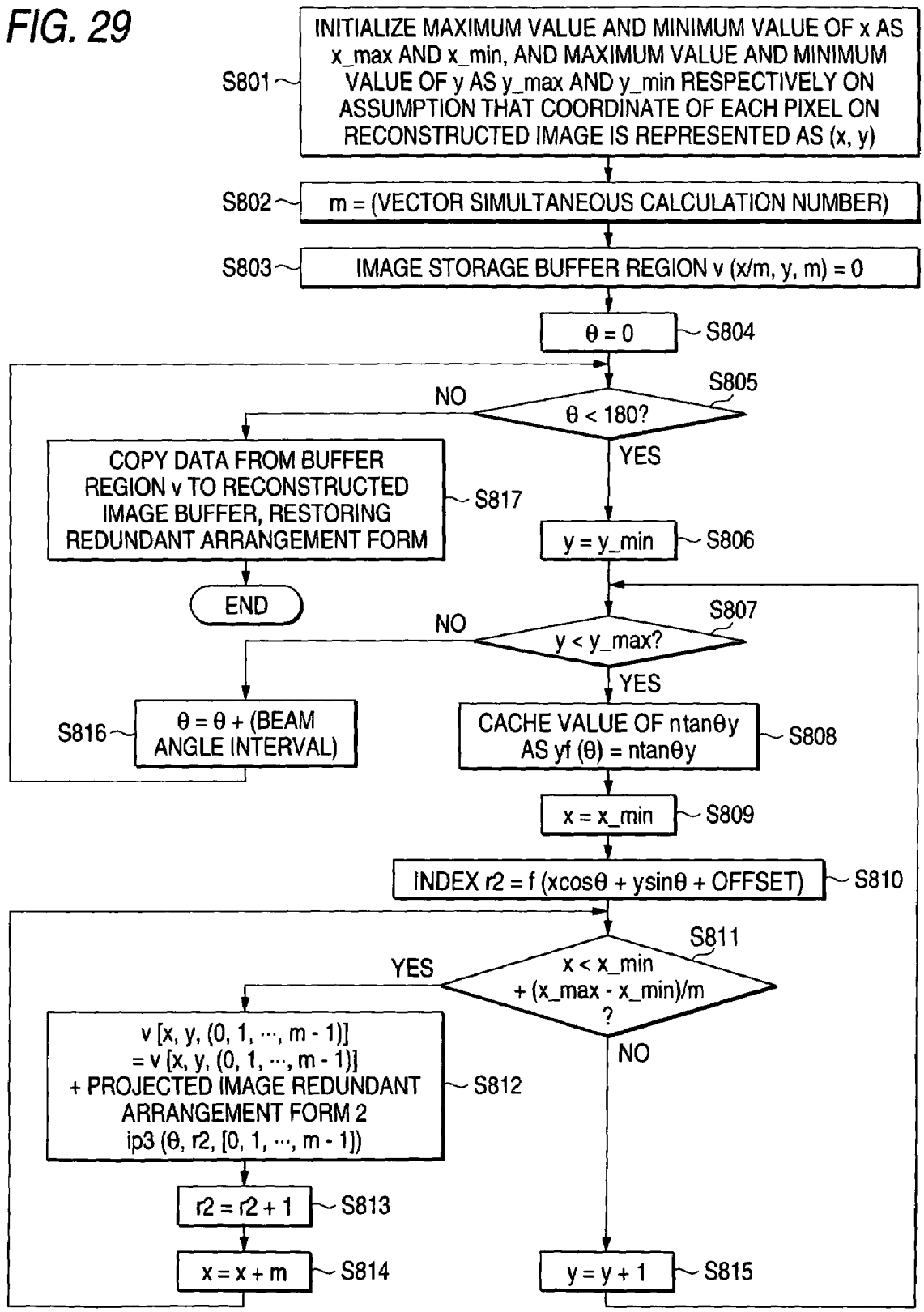
FIG. 29 is a detailed flow chart showing back projection calculation using the projected image redundant arrangement form 2 ip3 in the second embodiment.

FIG. 29 is a detailed flow chart of back projection calculation using the projected image redundant arrangement form 2 ip3 in step S800 in FIG. 27. In FIG. 29, first, the maximum value and minimum value of x are initiated as x_max and x_min, and maximum value and minimum value of y are initiated as y_max and y_min respectively on the assumption that the coordinate of each pixel on a reconstructed image is represented as (x,y) (step S801). Then, the multiple number m for redundancy is set as the vector simultaneous calculation number (step S802), and the image storage buffer region v(x/m,y,m) is set as zero (step S803).

Then, the beam angle θ is set as zero (step S804). The angle θ is compared with 180° (step S805), and when the angle θ is smaller than 180°, y is set as y_min (step S806). Then, y is compared with y_max (step S807), and when y is smaller than y_max, the value of n tan θy is cached as yf(θ)=n tan θy (step S808).

Then, x is set as x_min (step S809). Index r2 is set as r2=f(x cos θ+y sin θ+offset) (step S810) When the index is set in this processing position, index calculation in the inner loop can be simplified.

Then, x is compared with (x_min+(x_max−x_min)/m) (step S811). In this case, at the point of time when 1/m part is calculated, the remaining part is calculated by the vector operation.

When x is smaller than (x_min+(x_max−x_min)/m), v[x,y,(0, 1, . . . , m−1)]=v[x,y,(0, 1, . . . , m−1)]+the projected image redundant arrangement form 2 ip3(θ,r2, [0, 1, . . . , m−1]) is calculated (step S812). In this step S812, calculation can be made speedily because m arithmetic operations can be performed simultaneously by vector operation. In this embodiment, calculation of the positions separated on an image divided into m equal parts can be performed just by designating one index among the m equal parts.

Then, r2 is incremented by one to shift the index by one (step S813). Then, m is added to x (step S814) and the current processing position of this routine goes back to step S811 to repeat the aforementioned calculation. Then, y is incremented by one (step S815) to repeat the aforementioned calculation.

Then, the beam angle interval is added to the angle θ (step S816) and the current processing position of this routine goes back to step S805 to repeat the aforementioned calculation. When the calculation is repeated until the angle θ reaches 180°, the data in the buffer region v is copied to the reconstructed image buffer, while its redundant arrangement form is restored to the original form (step S817). In this embodiment, data for the whole region of the back projected image is rearranged and stored in buffer, and a process of restoring the rearranged data to the original data is finally performed at last.

Figure 30:
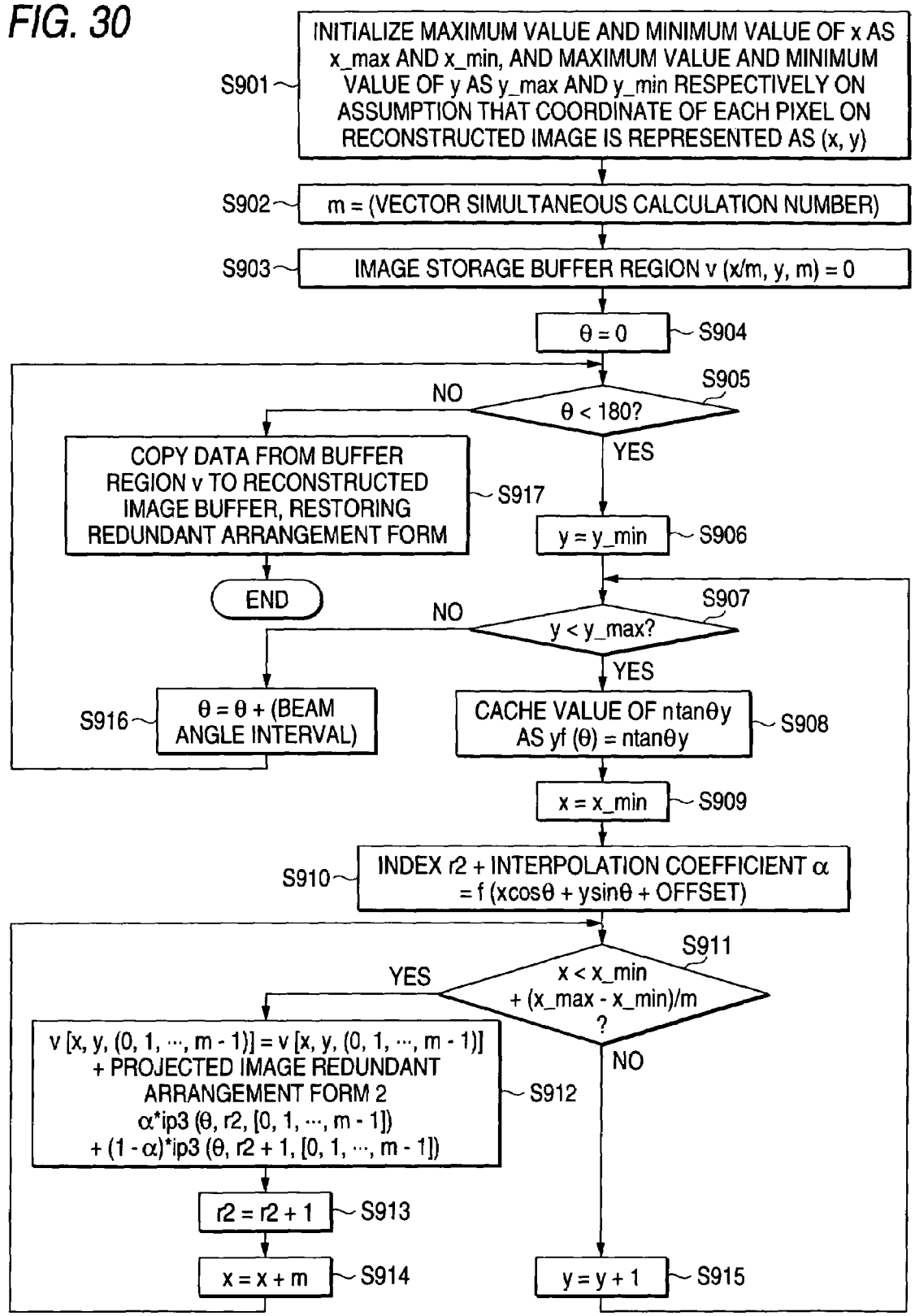
FIG. 30 is a detailed flow chart showing the case where interpolation is further performed in the back projection calculation using the projected image redundant arrangement form 2 ip3 in the second embodiment.

FIG. 30 is a flow chart showing the case where interpolation is further performed in the back projection calculation using the projected image redundant arrangement form 2 ip3. In FIG. 30, first, maximum value and minimum value of x are initiated as x_max and x_min, and maximum value and minimum value of y are initiated as y_max and y_min respectively on the assumption that the coordinate of each pixel on a reconstructed image is represented as (x, y) (step S901). Then, the multiple number m for redundancy is set as the vector simultaneous calculation number (step S902), and the image storage buffer region v(x/m,y,m) is set as zero (step S903)

Then, the beam angle θ is set as zero (step S904). The angle θ is compared with 180° (step S905), and when the angle θ is smaller than 180°, y is set as y_min (step S906). Then, y is compared with y_max (step S907). When y is smaller than y_max, the value of n tan θy is cached as yf(θ)=n tan θy (step S908).

Then, x is set as x_min (step S909), and the sum of the index r2 and the interpolation coefficient α is set as r2+α=f(x cos θ+y sin θ+offset) (step S910). When the index is set in this manner, index calculation in the inner loop can be simplified.

The interpolation coefficient α is constant even when x changes. The index r2 represents the integral part of the coordinate, and the interpolation coefficient α represents the real part of the coordinate.

Then, x is compared with (x_min+(x_max−x_min)/m) (step S911). In this case, at the point of time when 1/m part is calculated, the remaining part is calculated by the vector operation.

When x is smaller than (x_min+(x_max−x_min)/m), v[x,y, (0, 1, . . . , m−1)]=v[x,y,(0, 1, . . . , m−1)]+the projected image redundant arrangement form 2 α*ip3(θ,r2, [0, 1, . . . , m−1])+ (1−α)*ip3(θ,r2+1, [0, 1, . . . ,m−1]) is calculated (step S912). When interpolation calculation is performed in this processing position, calculation speed is improved because the time required for interpolation calculation is shortened by vectorization. In addition, image quality is improved.

Then, r2 is incremented by one to shift the index by one (step S913). Then, m is added to x (step S914) and the current processing position of this routine goes back to step S911 to repeat the aforementioned calculation. Then, y is incremented by one (step S915) to repeat the aforementioned calculation.

Then, the beam angle interval is added to the angle θ (step S916) and the current processing position of this routine goes back to step S905 to repeat the aforementioned calculation. When the calculation is repeated until the angle θ reaches 180°, the data in the buffer region v are copied to the reconstructed image buffer, while its redundant arrangement form is restored to the original form (step S917). In this embodiment, data for the whole region of the back projected image is rearranged and stored in buffer, and a process of restoring the rearranged data to the original data is finally performed at last.

Figure 31:
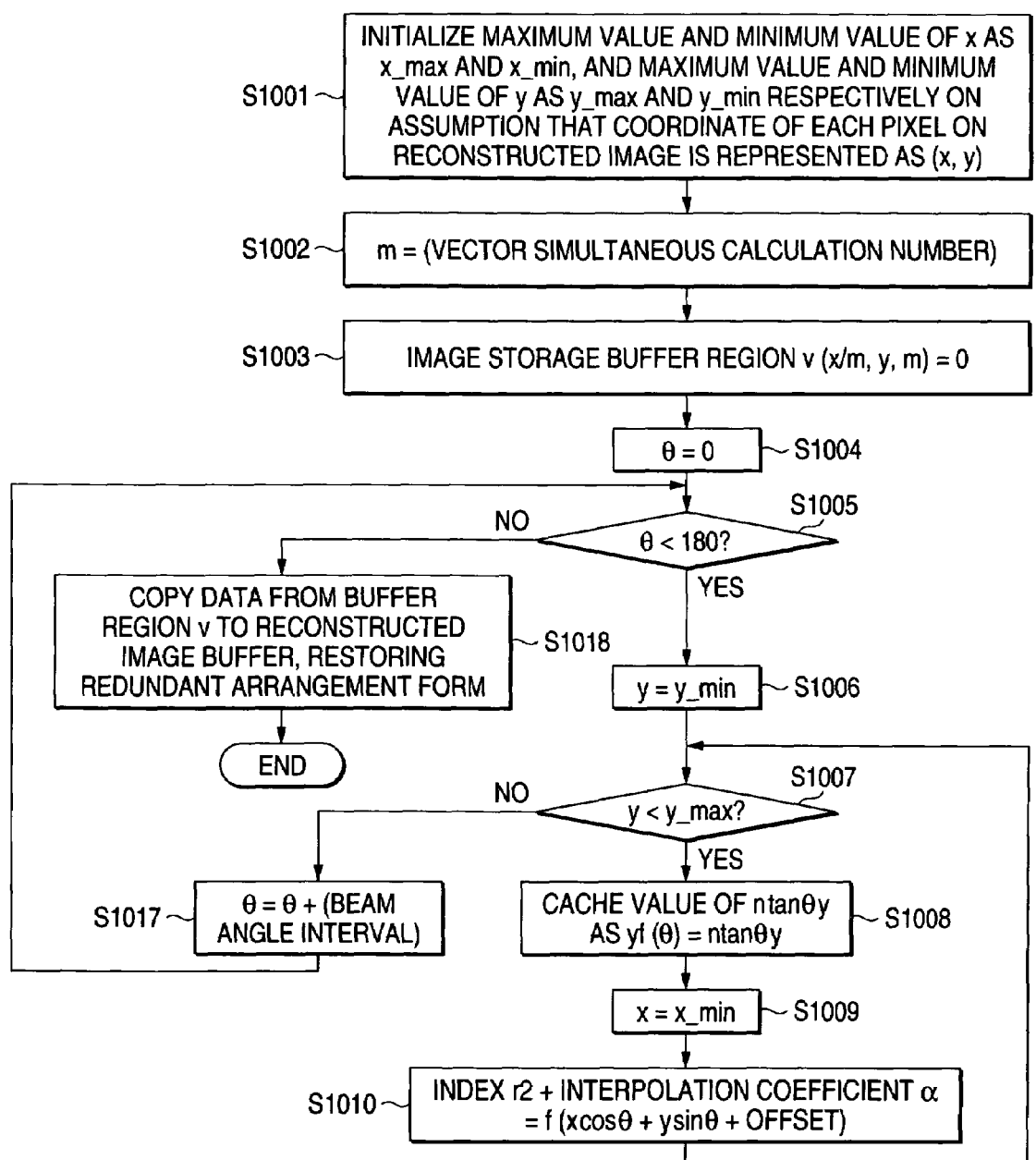
FIG. 31 is a detailed flow chart showing the case where interpolation is approximated in the back projection calculation using the projected image redundant arrangement form 2 ip3 in the second embodiment.
Figure 32:
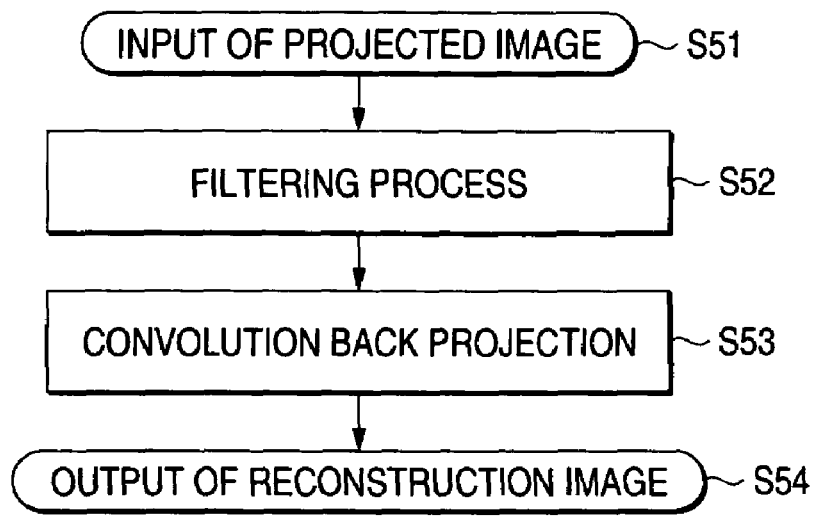
FIG. 32 is a flow chart showing the outline of a calculation procedure in a CT image generating method according to the related art.
Figure 33:
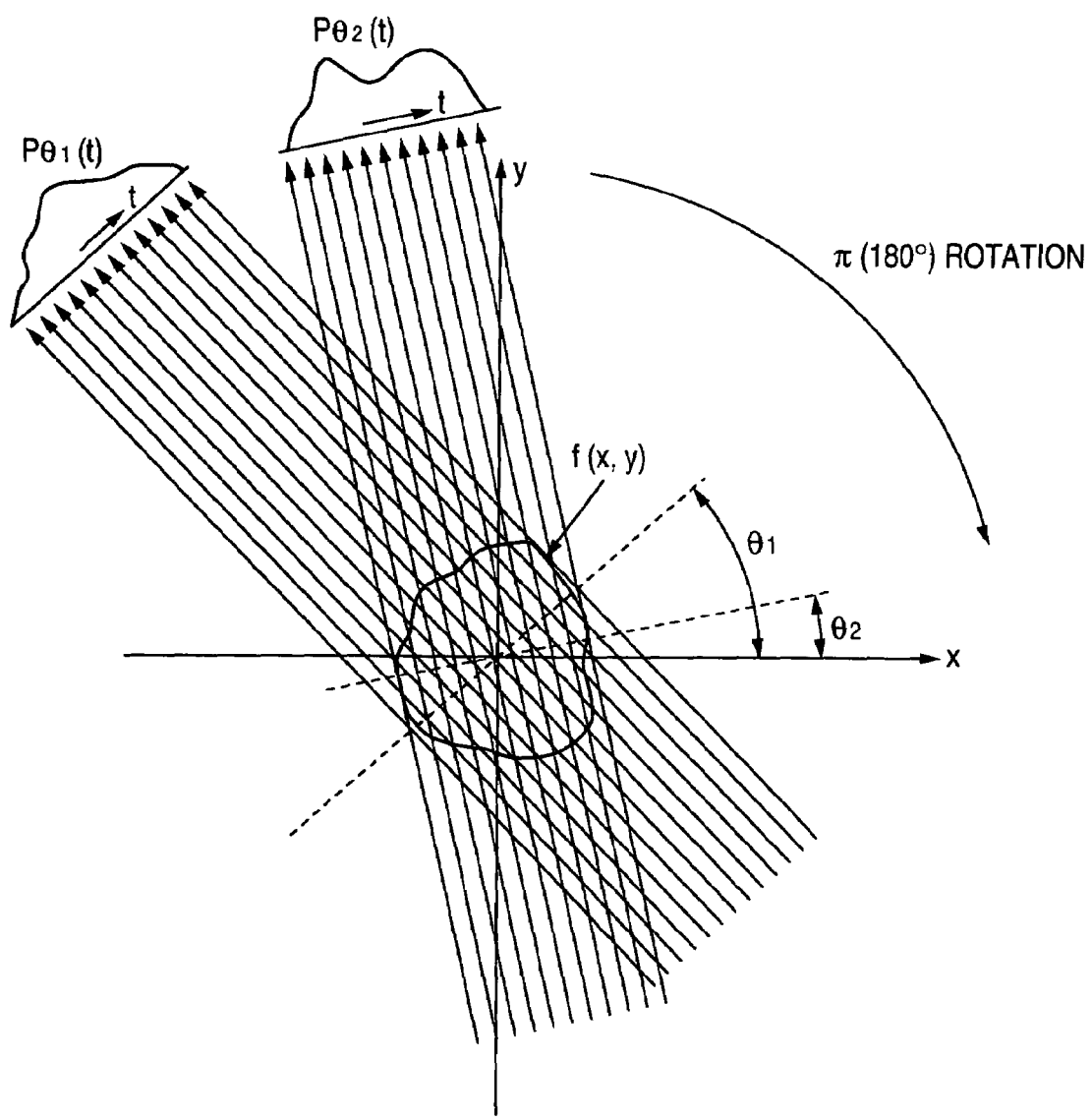
FIG. 33 is a schematic view for explaining a standard CT image generating method in a CT apparatus according to the related art.
Figure 34:
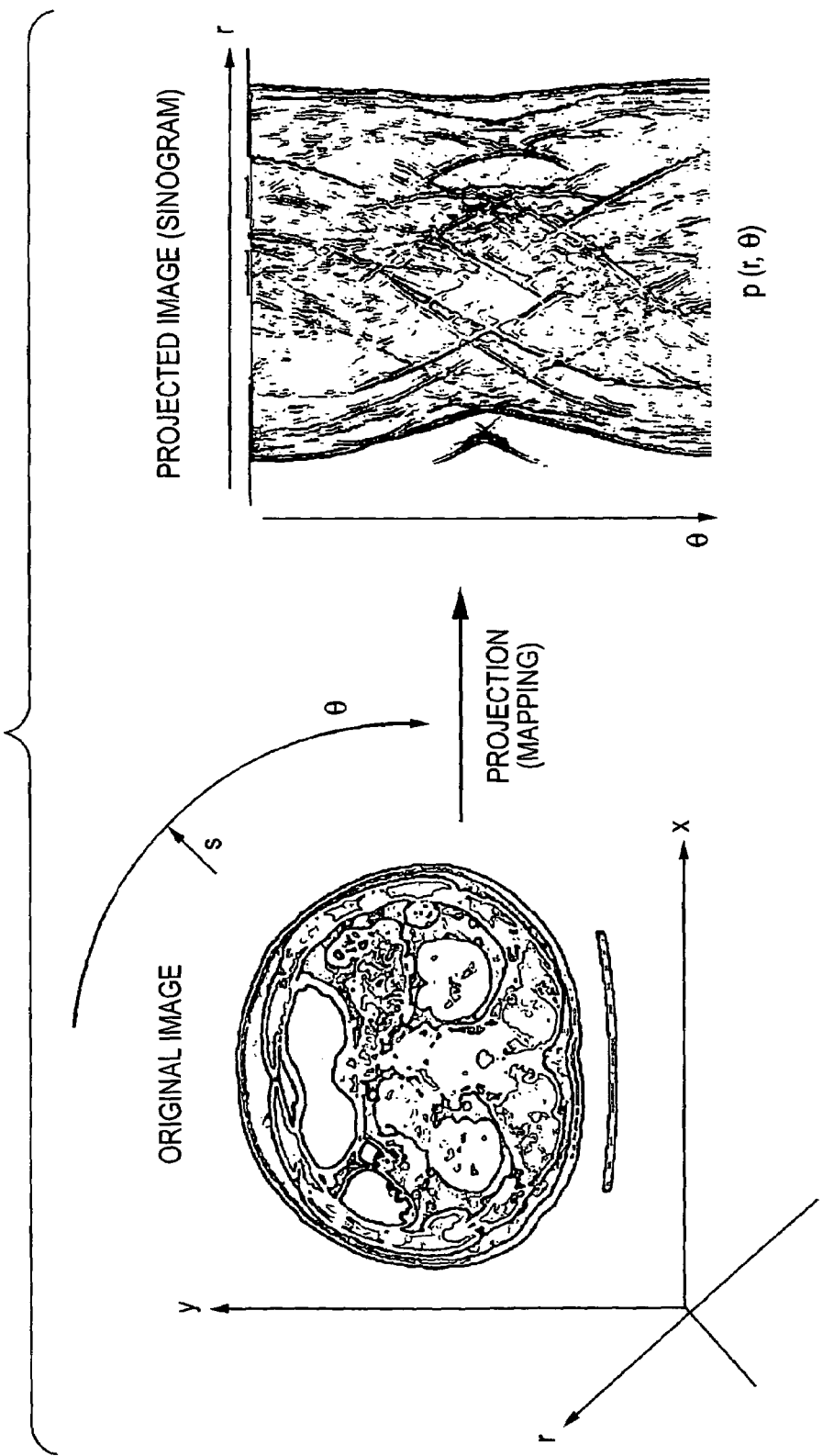
FIG. 34 is an explanatory view showing a process of generating a projected image from an original X-ray image in the CT apparatus according to the related art.
Figure 35:
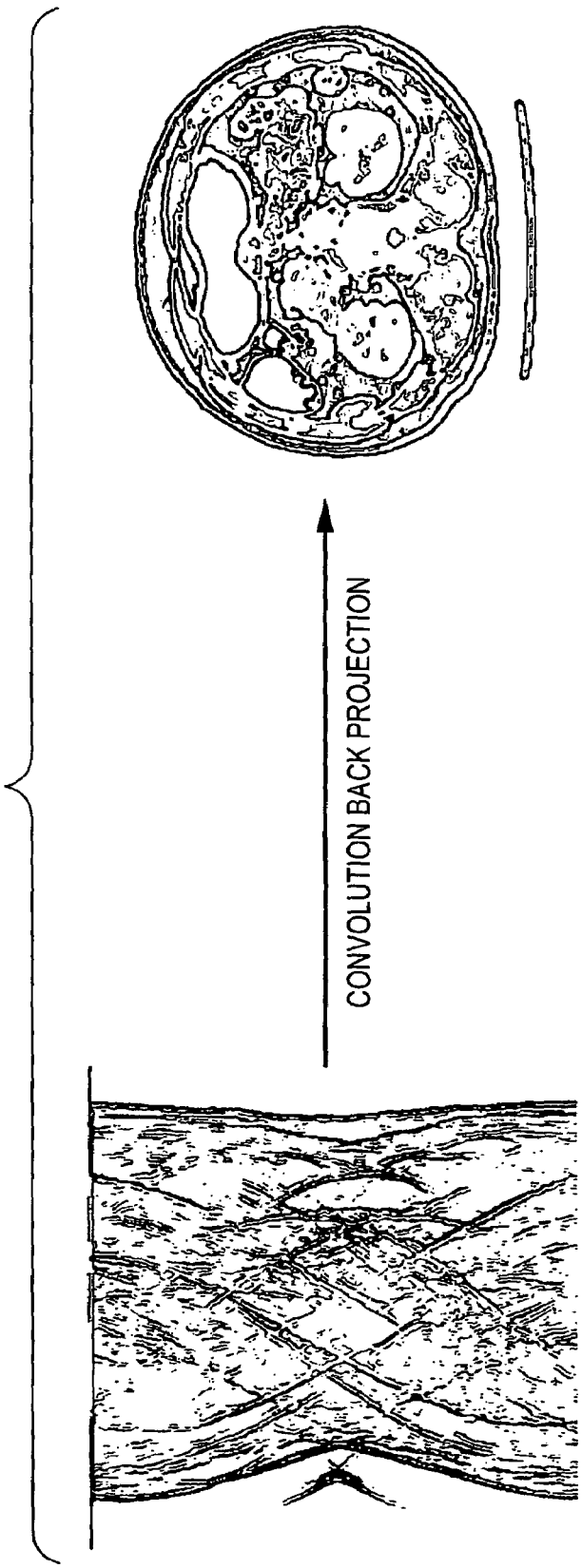
FIG. 35 is an explanatory view showing a process of reconstructing the original image from the projected image in the CT apparatus according to the related art.
Figure 36:
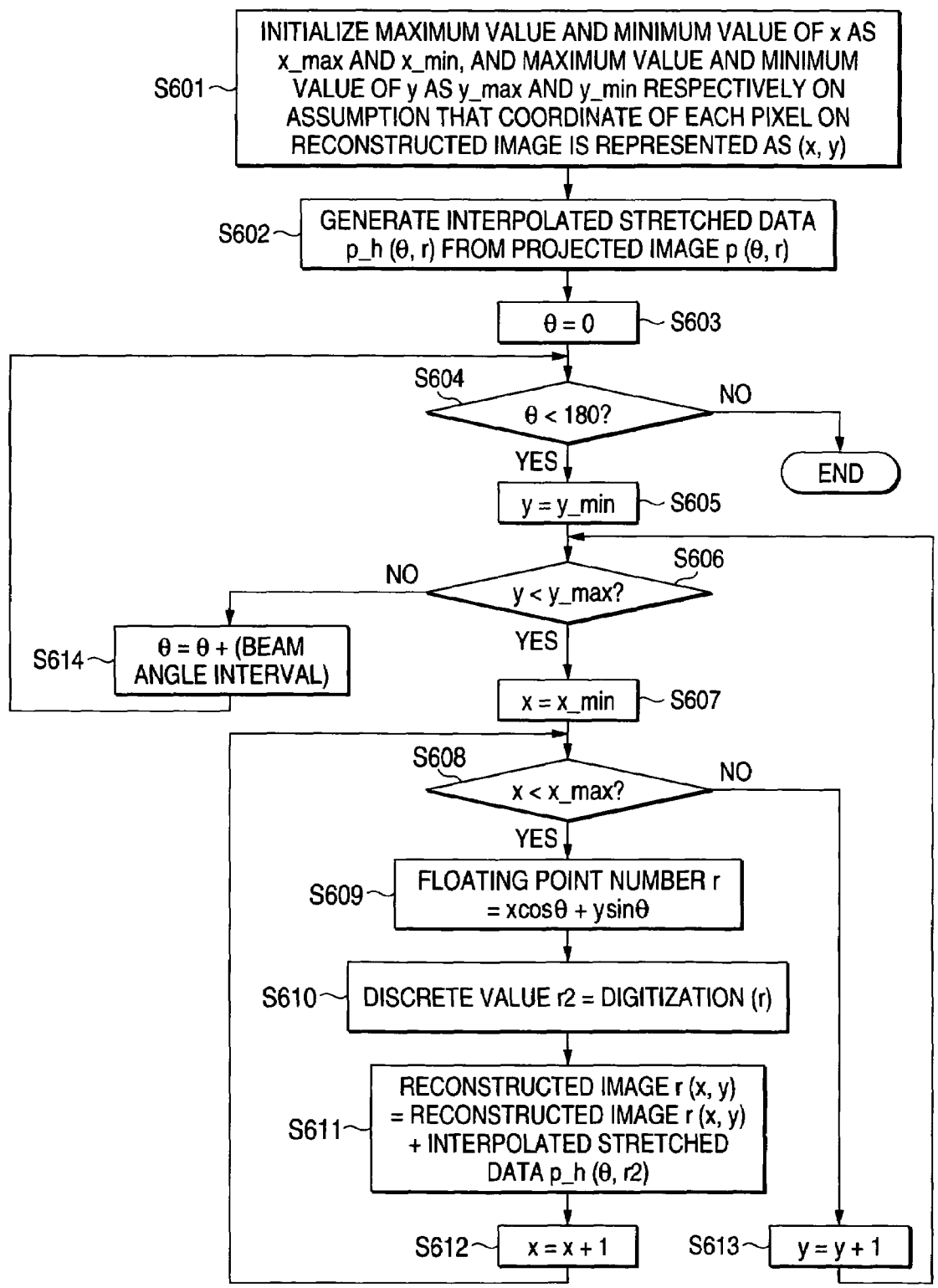
FIG. 36 is a flow chart for explaining algorithm of back projection calculation according to the related art.

FIG. 31 is a detailed flow chart showing the case where interpolation is approximated by back projection 2 ip3 using the projected image redundant arrangement form. In FIG. 31, first, maximum value and minimum value of x are initiated as x_max and x_min, and maximum value and minimum value of y are initiated as y_max and y_min respectively on the assumption that the coordinate of each pixel on a reconstructed image is represented as (x,y) (step S1001). Then, the multiple number m for redundancy is set as the vector simultaneous calculation number (step S1002), and the image storage buffer region v(x/m,y,m) is set as zero (step S1003).

Then, the beam angle θ is set as zero (step S1004), and the angle θ is compared with 180° (step S1005). When the angle θ is smaller than 180°, y is set as y_min (step S1006). Then, y is compared with y_max (step S1007). When y is smaller than y_max, the value of n tan θy is cached as yf(θ)=n tan θy (step S1008).

Then, x is set as x_min (step S1009), and the sum of the index r2 and the interpolation coefficient α is set as r2+α=f(x cos θ+y sin θ+offset) (step S1010). When the index is set in this processing position, index calculation in the inner loop can be simplified. The interpolation coefficient α is constant even when x changes. The index r2 represents the integral part of the coordinate, and the interpolation coefficient α represents the real part of the coordinate.

Then, α is approximated to one of projected image redundant arrangement forms prepared in advance (step S1011). This is because improvement in accuracy can be attained when calculation is performed in accordance with α which is most approximate to one of projected image redundant arrangement forms which are prepared in advance being changed little by little.

Then, x is compared with (x_min+(x_max−x_min)/m) (step S1012). In this case, at the point of time when 1/m part is calculated, the remaining part is calculated by the vector operation.

When x is smaller than (x_min+(x_max−x_min)/m), a projected image redundant arrangement form 2 ip3(θ,r2, [0, 1, . . . , m−1]) represented by v[x,y,(0, 1, . . . , m−1)]=v[x, y,(0, 1, . . . , m−1)]+α is calculated (step S1013), and a form which is most adapted to α is selected from the plurality of projected image redundant arrangement forms. Because α is determined outside the loop, there is no calculation necessary for the selection in this step. When interpolation calculation is performed in this processing position, a predetermined speed improving effect can be obtained because the time required for interpolation calculation is shortened by vectorization. In addition, image quality is improved.

Then, r2 is incremented by one to shift the index by one (step S1014). Then, m is added to x (step S1015) and the current processing position of this routine goes back to step S1012 to repeat the aforementioned calculation. Then, y is incremented by one (step S1016) to repeat the aforementioned calculation.

Then, the beam angle interval is added to the angle θ (step S1017) and the current processing position of this routine goes back to step S1005 to repeat the aforementioned calculation. When the calculation is repeated until the angle θ reaches 180°, the rearranged data are copied from the buffer region v to the reconstructed image, being restored to the original data (step S1018). In this embodiment, data for the whole region of the back projected image is rearranged and stored in buffer, and a process of restoring the rearranged data to the original data is finally performed at last.

According to the back projection calculation method of this embodiment, improvement in image quality can be attained by projecting the projected data rearranged in accordance with the vector operation and performing the interpolation calculation. Moreover, calculation speed can be improved while image quality is maintained high by stretching the projected data with interpolation. In addition, both memory utilizing efficiency and memory access efficiency can be improved because the amount of the redundant portions is small.

Although in the embodiment described above, "parallel projection" is used and explained, "sector projection" and "conical projection" may be used in the same manner. The simultaneous calculation number m may be larger than the number which can be calculated simultaneously by a computer in practical use. This is because pseudo-simultaneous calculation can be performed, for example, with the presence of parallel pipelines, superscalars, etc.

In order to reduce distortion error at the time of projection, the calculation of the reconstructed image may be separated into parts by an arbitrary unit such as 45° or 90° and then the parts may be superposed on one another. Moreover, as each calculation can be separated into parts by the angle, the x coordinate or the y coordinate, the calculation of the reconstructed image can be performed by parallel processing, network distributed processing or the combination thereof. That is, as a CT image is generally constituted by a plurality of slices (images), distributed processing may be performed while, for example, the region of a back projected image is separated into upper and lower parts or left and right parts on a display screen, or into three parts having a beam angle θ range of from 0° to 60°, from 60° to 120° and from 120° to 180° respectively by the beam angle. Alternatively the distributed processing maybe performed in accordance with each slice.

As the vector-processing unit, a vector processor capable of simultaneously executing a plurality of calculations of the same kind with one command, an arithmetic unit or digital signal processor having so-called SIMD (Single Instruction/ Multiple Data) instructions or an arithmetic unit capable of accepting SIMD instructions virtually may be used.

The vector operation may be carried out by using a GPU (Graphic Processing Unit). The GPU is an arithmetic processing unit designed to be specialized particularly for image processing compared to a general-purpose CPU. Generally, the GPU is mounted separately from a CPU in a computer having the CPU.

If a unused data range in post-calculation is known, for example by the value of θ when generating the redundant arrangement form, the generation of the redundant arrangement form may be omitted with respect to the range.

The invention can be applied to a back projection method in an image reconstruction, and particularly to a method for data arrangement and adjustment of calculation process to calculate the back projection method in image reconstruction speedily.

As described above, in the back projection method according to the invention, the projected image redundant arrangement form is generated so that the projection data is arranged so as to be redundant and gather in access units. Accordingly, utilizing efficiency of a computer can be improved, and the image reconstruction process can be performed speedily.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A back projection method in an image reconstruction method comprising:
   generating, by use of a processor, a projected image redundant arrangement form in which a projection data is rearranged so that said projection data has a redundant arrangement, where said projection data is arranged on continuous memory addresses by a predetermined access interval to extent of an access unit or a multiple number for redundancy, which represents times of calculating said projection data simultaneously by a single access to a memory storing each of said projection data, and
   performing, by use of said or another processor, a back projection calculation using said projected image redundant arrangement form.

2. A back projection method according to claim 1, wherein said projection data is obtained by irradiating a subject with an electromagnetic wave which is radiolucent, and detecting the electromagnetic wave transmitted through said subject,
   said back projection method further comprising the step of displaying a back-projected image on a display.

3. A back projection method according to claim 2, further comprising
   performing a vector operation for said projection data arranged in said projected image redundant arrangement form.

4. A back projection method according to claim 3, wherein said multiple number for redundancy in said projected image redundant arrangement form is not smaller than a simultaneous calculation number of said vector operation.

5. A back projection method according to claim 3, wherein said multiple number for redundancy in said projected image redundant arrangement form is equal to a simultaneous calculation number of said vector operation.

6. A back projection method according to claim 3, wherein said projected image redundant arrangement form is a form in which said projection data that is necessary for said vector operation is sequentially arranged being adjacent to one another.

7. A back projection method according to claim 2, further comprising
   generating a projected image projection form in which a beam angle of said projection data is used for performing a projection.

8. A back projection method according to claim 1, wherein said back projection is performed by using a graphic processing unit.

9. A back projection method according to claim 1, wherein said back projection is performed by network distributed processing.

10. A back projection method according to claim 7, further comprising
    stretching said projection data by interpolation to thereby generate said projected image projection form.

11. A back projection method according to claim 7, further comprising
    stretching said projection data by interpolation to thereby generate said projected image projection form in which a pixel pitch of a back-projected image is aligned with a pixel pitch of said projected image projection form.

12. A back projection method according to claim 10, wherein a magnifying power of said projected image projection form depends on the beam angle.

13. A computer-readable medium containing a set of instructions for back projection in image reconstruction for execution by a processor connected to at least one of an operating portion, a control portion, an image collecting portion, an image processing portion and an image display portion, said set of instructions comprising
    generating a projected image redundant arrangement form in which a projection data is rearranged so that said projection data has a redundant arrangement, where said projection data is arranged on continuous memory addresses by a predetermined access interval to extent of an access unit or a multiple number for redundancy, which represents times of calculating said projection data simultaneously by a single access to a memory storing each of said projection data, and
    performing a back projection calculation using said projected image redundant arrangement form.

14. A back projection method according to claim 2, further comprising
    performing a vector operation for said projection data arranged in said projected image redundant arrangement form.

15. A back projection method according to claim 14, wherein said multiple number for redundancy in said projected image redundant arrangement form is not smaller than a simultaneous calculation number of said vector operation.

16. A back projection method according to claim 14, wherein said multiple number for redundancy in said projected image redundant arrangement form is equal to a simultaneous calculation number of said vector operation.

17. A back projection method according to claim 14, wherein said projected image redundant arrangement form is a form in which said projection data that is necessary for said vector operation is sequentially arranged being adjacent to one another.

* * * * *

UNITED STATES PATENT AND TRADEMARK OFFICE
CERTIFICATE OF CORRECTION

PATENT NO. : 7,574,027 B2 Page 1 of 1
APPLICATION NO. : 11/111311
DATED : August 11, 2009
INVENTOR(S) : Kazuhiko Matsumoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1117 days.

Signed and Sealed this

Seventh Day of September, 2010

David J. Kappos
*Director of the United States Patent and Trademark Office*